(12) United States Patent
Shimomura et al.

(10) Patent No.: US 6,347,168 B1
(45) Date of Patent: Feb. 12, 2002

(54) OPTICAL SWITCH AND OPTICAL SWITCH SYSTEM

(75) Inventors: Hirofumi Shimomura; Naoya Henmi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/493,934

(22) Filed: Jan. 28, 2000

(30) Foreign Application Priority Data

Jan. 28, 1999 (JP) .............................. 11-020446

(51) Int. Cl.⁷ ................................................. G02B 6/42
(52) U.S. Cl. ............................ 385/19; 385/16; 385/17
(58) Field of Search ....................... 385/16–24

(56) References Cited

U.S. PATENT DOCUMENTS 4,322,126 A * 3/1982 Minowa et al. ............... 385/16

FOREIGN PATENT DOCUMENTS

| JP | 58123501 | 7/1983 |
| JP | 61231530 | 10/1986 |
| JP | 9230151 | 9/1997 |
| JP | 10341207 | 12/1998 |

\* cited by examiner

Primary Examiner—Phan T. H. Palmer
(74) Attorney, Agent, or Firm—Young & Thompson

(57) ABSTRACT

There is disclosed an array type space optical switch 10 of the present invention, in which each one end of optical fibers 101a to 104a, 101b to 104b is fixed to support members 105a, 105b. The optical fibers 101a and 101b form one pair, and have end surfaces opposite to each other, and the optical fibers 102a and 102b form one pair, and have end surfaces opposite to each other. Moreover, the optical fibers 103a and 103b form one pair, and have end surfaces opposite to each other, and the optical fibers 104a and 104b form one pair, and have end surfaces opposite to each other. A space propagation part 200 is formed between the end surfaces of the optical fibers 101a to 104a and 101b to 104b. An interrupting plate is inserted to or extracted from the space propagation part 200.

29 Claims, 13 Drawing Sheets

OPTICAL SWITCH AND OPTICAL SWITCH SYSTEM

BACKGROUND OF THE INVENTION

1. Field of the Invention

The present invention relates to an optical switch and an optical switch system which are used in optical communication and photonic switching, particularly to an optical switch and an optical switch system in which the necessary amount of hardware can be reduced.

2. Description of the Related Art

In photonic switching such as an optical cross-connecting system in which a light signal is used as light without being converted to an electric signal in a node to edit a light propagation path, a node scale can be reduced, which contributes to communication cost reduction. An optical switch technique is important for constituting such node. As a conventional optical switch, there have been proposed a switch prepared using lithium niobate, an optical crossbar switch using a semiconductor optical amplifier as a gate switch, and the like. Various proposals have also been submitted for optical switch systems such as an optical switch network using these optical switches.

For example, a conventional optical switch system aiming at application to an interconnected network of parallel computers is proposed in the Proceedings for 1996 General Convention of the Institute of Electronics, Information and Communication Engineers of Japan (IEICE), No. SB-9-5. In this optical switch system, an optical crossbar switch employing a semiconductor optical amplifier as a gate switch is used. Moreover, an optical switch network in which a transmission capacity per port is increased by using a wavelength-division multiplexing technology is also proposed in the Proceedings of 1996 Communication Society meeting of IEICE, No.B-1072.

However, the optical crossbar switch used in the above-described conventional optical switch system requires semiconductor optical amplifiers by the square of the number of input/output ports. Therefore, when switch scale increases, cost rapidly increases. There is further problem that it becomes very difficult to mount the switch. For example, a 4×4 optical crossbar switch with four input ports and four output ports requires 16 semiconductor optical amplifiers, but a 16×16 optical crossbar switch requires 256 amplifiers, and a 64×64 optical crossbar switch requires 4096 semiconductor optical amplifiers.

Moreover, in the optical switch system using the wavelength-division multiplexing technology, in order to reduce the number of gates, a wavelength-division multiplexing light source is necessary. This raises a problem that it becomes difficult to inexpensively constitute the optical switch system.

SUMMARY OF THE INVENTION

An object of the present invention is to provide an optical switch system which can reduce the number of necessary optical switches and which is small in size and low in cost.

According to the present invention, there is provided an optical switch comprising: at least one optical fiber pair arranged so that light emitted from a first optical fiber is coupled to a second optical fiber via a void; and an optical breaker for interrupting the optical coupling between the first and second optical fibers.

According to the present invention, there is provided an optical switch system comprising: at least one optical branching unit for branching at least one input light signal to a predetermined number of branched output lights; at least one optical combining unit for combining one of the branched output lights of at least one optical branching unit; and at least one optical switch inserted between the optical branching unit and at least one optical combining unit to which each of the branched output lights of the optical branching unit is supplied.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Embodiments of the present invention will next be described with reference to the drawings.

(First Embodiment)

Figure 1:
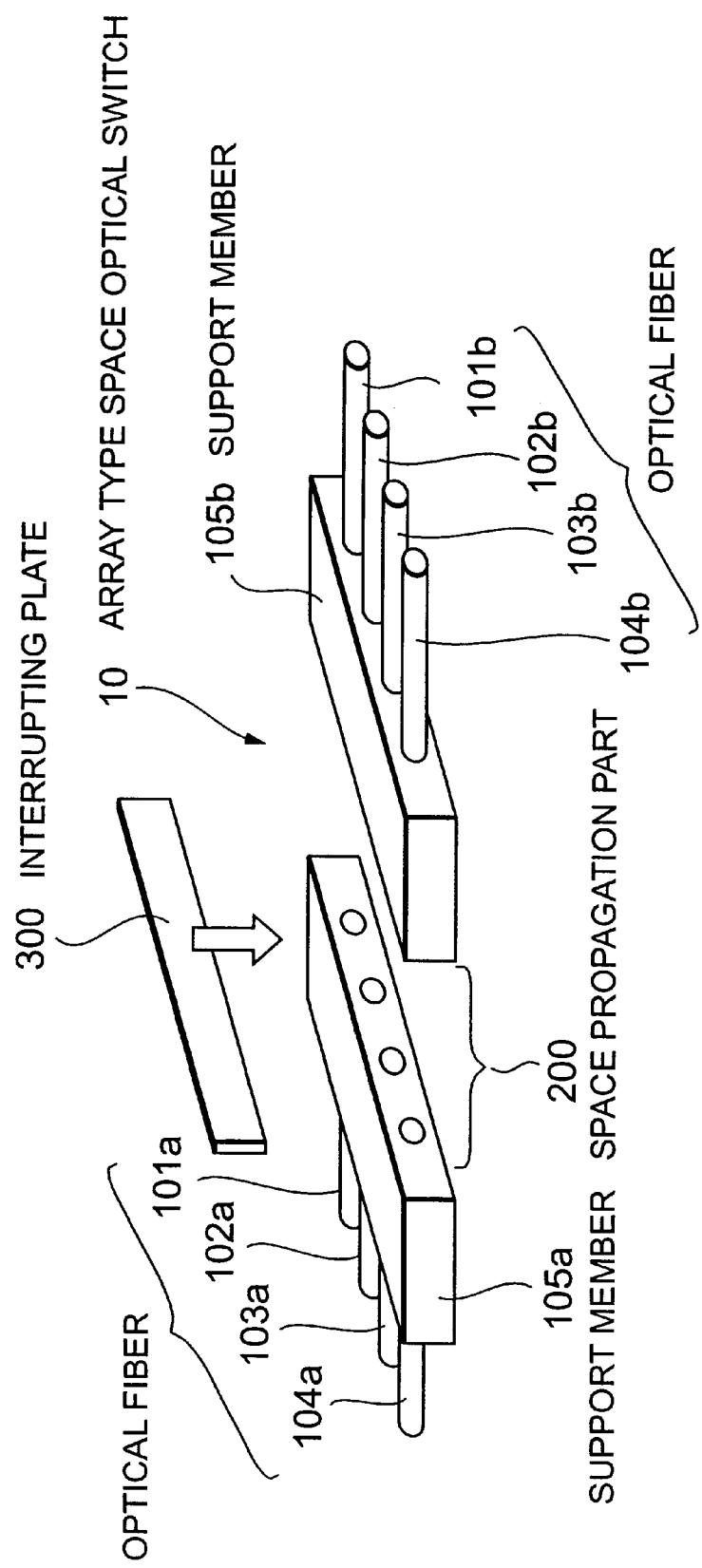
FIG. 1 is a perspective view of an array type space optical switch according to a first embodiment of the present invention.

FIG. 1 is a perspective view schematically showing an array type space optical switch as an optical switch according to a first embodiment of the present invention. As shown in FIG. 1, in an array type space optical switch 10 of the present embodiment, one end of each of optical fibers 101a to 104a, 101b to 104b is fixed to support members 105a, 105b. The optical fibers 101a and 101b form one pair, and have end surfaces opposite to each other, and the optical fibers 102a and 102b form one pair, and have end surfaces opposite to each other. Moreover, the optical fibers 103a and 103b form one pair, and have end surfaces opposite to each other, and the optical fibers 104a and 104b form one pair, and have end surfaces opposite to each other. A space propagation part 200 is formed between the end surfaces of the optical fibers 101a to 104a and 101b to 104b.

The array type space optical switch 10 of the present embodiment is provided with an interrupting plate 300 to be inserted to or extracted from the space propagation part 200. Here, an optical element for collimating the light passing through the space propagation part 200 may be disposed in the space propagation part 200. Thereby, the lights emitted from the end surfaces of the optical fibers 101a to 104a on the side of the support member 105a are collimated in the space propagation part 200, and coupled to the optical fibers corresponding to the optical fibers 101a to 104a.

A method of manufacturing the array type space optical switch 10 of the present embodiment is as follows. First, a part of each of four optical fibers is removed to form the optical fibers 101a to 104a, 101b to 104b, and the space propagation part 200. Subsequently, the array type space optical switch 10 is provided with the interrupting plate 300 which can move in a direction perpendicular to a propagation direction of the lights emitted from the end surfaces of the optical fibers 101a to 104a on the side of the support member 105a.

Figure 2:
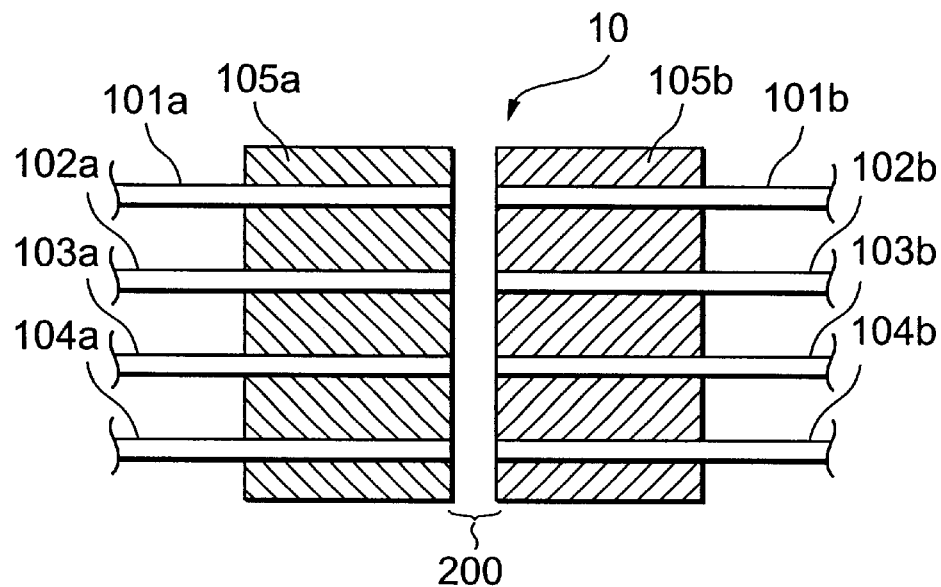
FIG. 2 is a sectional view showing that an interrupting plate is not inserted in a space propagation part in the array type space optical switch of FIG. 1.

FIG. 2 is a sectional view showing that the interrupting plate 300 is not inserted in the space propagation part 200 in the array type space optical switch 10 shown in FIG. 1. In the state shown in FIG. 2, a signal light inputted to the array type space optical switch 10 is propagated in the space propagation part 200, and outputted from the array type space optical switch 10. By disposing collimators such as collimating lenses on the output ends of the optical fibers 101a to 104a, lights can be propagated keeping collimated in the space propagation part 200. Moreover, when multi-mode fibers are used as the optical fibers 101b to 104b, the output lights of the optical fibers 101a to 104a can be coupled to the optical fibers 101b to 104b with a low loss without using any collimator.

In the state shown in FIG. 2, a signal light of 1550 nm band is inputted to the array type space optical switch 10 from the end surface of each of the optical fibers 101a to 104a on the opposite side of the support member 105a. In this case, the signal light emitted from the end surface of the optical fiber 101a on the side of the support member 105a is propagated toward the optical fiber 101b. The signal light emitted from the end surface of the optical fiber 102a on the side of the support member 105a is propagated toward the optical fiber 102b. The signal light emitted from the end surface of the optical fiber 103a on the side of the support member 105a is propagated toward the optical fiber 103b. The signal light emitted from the end surface of the optical fiber 104a on the side of the support member 105a is propagated toward the optical fiber 104b. Therefore, while the interrupting plate 300 is not interrupted in the space propagation part 200, optical transmission paths in the array type space optical switch 10 are all turned on.

Figure 3:
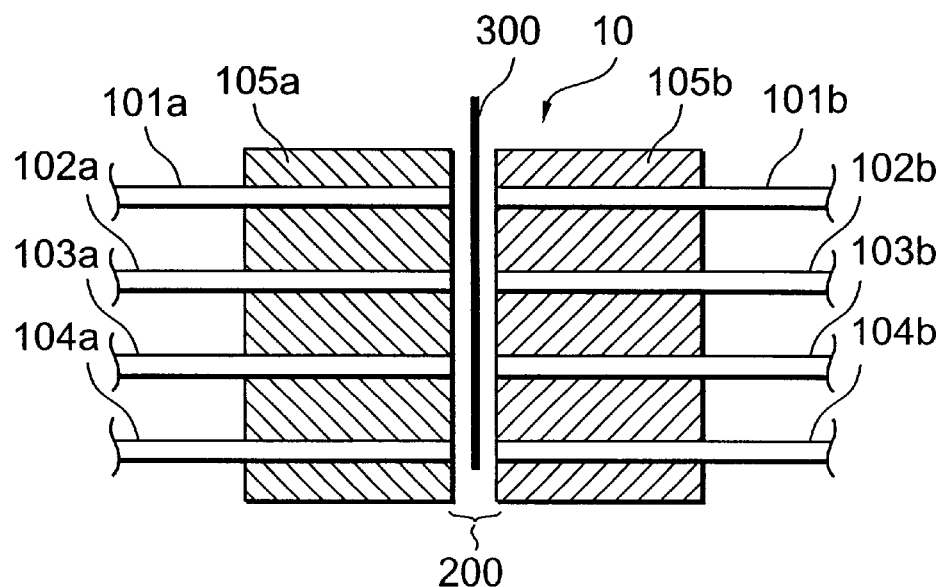
FIG. 3 is a sectional view showing that the interrupting plate is inserted in the space propagation part in the array type space optical switch shown in FIG. 1.

FIG. 3 is a sectional view showing that the interrupting plate 300 is inserted in the space propagation part 200 in the array type space optical switch 10 shown in FIG. 1. As shown in FIG. 3, when the interrupting plate 300 is inserted in the space propagation part 200, the signal lights inputted to the array type space optical switch 10 from the end surfaces of the optical fibers 101a to 104a on the opposite side of the support member 105a are interrupted by the interrupting plate 300, and are not outputted from the array type space optical switch 10. In this case, the state in which all the optical transmission paths are turned on is switched to a state in which all the optical transmission paths in the array type space optical switch 10 are turned off.

As described above, by inserting the interrupting plate 300 to the space propagation part 200, or extracting the interrupting plate 300 from the space propagation part 200, the switching on or off of a plurality of pairs of optical fibers can be performed altogether, in which each pair is formed by two optical fibers having their end surfaces opposite to each other.

(Second Embodiment)

Figure 4:
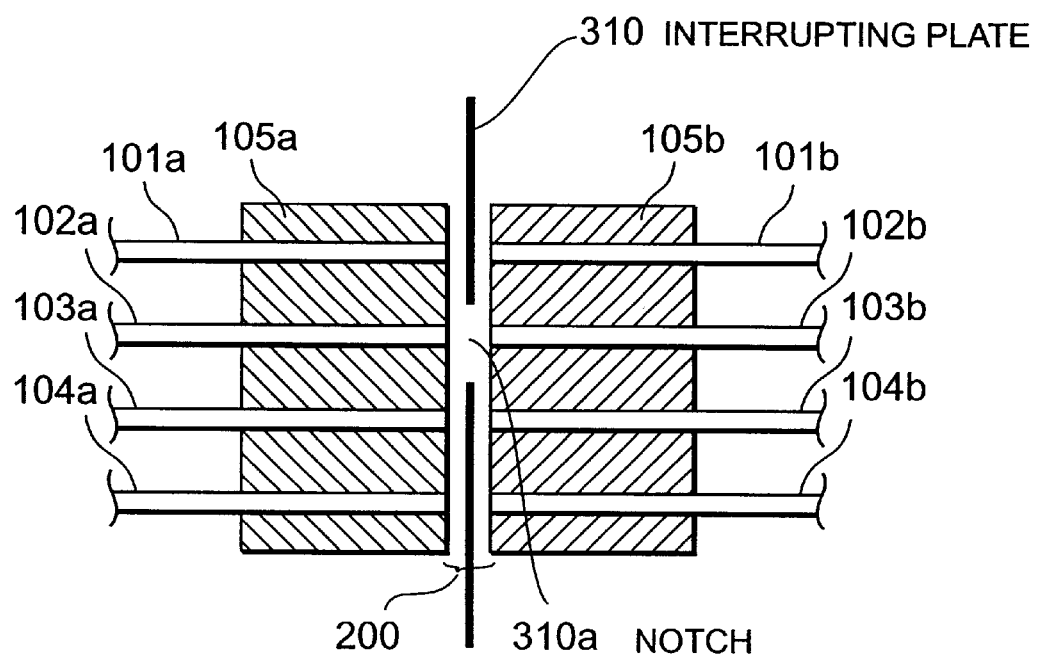
FIG. 4 is a sectional view of the array type space optical switch according to a second embodiment of the present invention.
Figure 5:
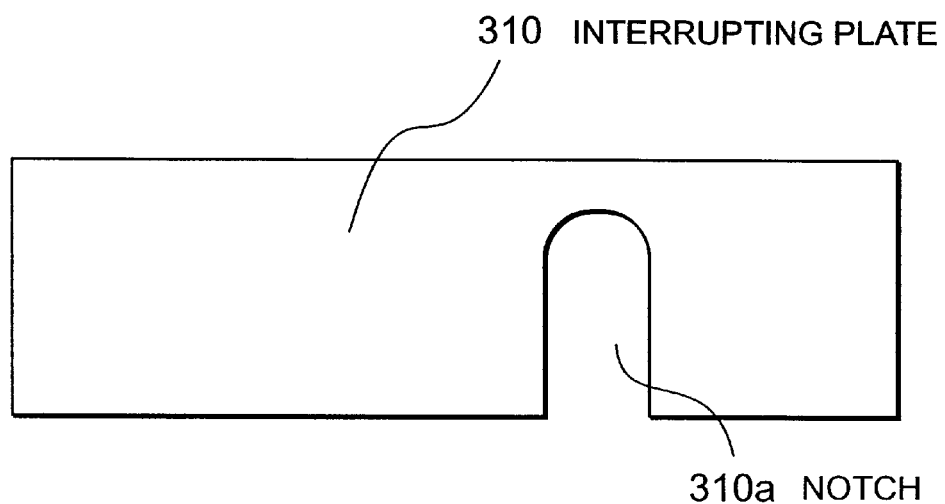
FIG. 5 is a plan view of the interrupting plate included in the constitution of FIG. 4.

FIG. 4 is a sectional view showing the array type space optical switch as the optical switch according to a second embodiment of the present invention. Moreover, FIG. 5 is a plan view of an interrupting plate 310 in FIG. 4. The array type space optical switch of the second embodiment is different from that of the first embodiment in the shape of the interrupting plate 310 inserted in the space propagation part 200. In FIG. 4, the same constituting components as those of the first embodiment are denoted by the same reference numerals, and respects different from those of the first embodiment will mainly be described hereinafter.

As shown in FIG. 4, the array type space optical switch of the second embodiment is provided with the interrupting plate 310 to be inserted to the space propagation part 200 or extracted from the space propagation part 200, instead of the interrupting plate 300 used in the first embodiment. In this interrupting plate 310, a notch part 310a is formed as shown in FIGS. 4 and 5. The notch part 310a is disposed in positions corresponding to the optical fibers 102a, 102b when the interrupting plate 310 is inserted to the space propagation part 200. When the interrupting plate 310 is inserted to the space propagation part 200, the signal light is propagated between the optical fibers 102a and 102b via the space propagation part 200.

In the second embodiment, a signal light of 1300 nm band is inputted to the array type space optical switch from each end surface of the optical fibers 101a to 104a on the opposite side of the support member 105a. In an on state in which the interrupting plate 310 is not inserted to the space propagation part 200, and the interrupting plate 310 is disposed outside the space propagation part 200, in the same manner as in the first embodiment, the signal light inputted to the array type space optical switch from each end surface of the optical fibers 101a to 104a is passed through the space propagation part 200 and outputted from the array type space optical switch.

From the above-described on state of the array type space optical switch, when only the signal light inputted to the optical fiber 102a among the signal lights inputted to the optical fibers 101a to 104a is outputted from the array type space optical switch, the interrupting plate 310 is inserted to the space propagation part 200 and the interrupting plate 310 is disposed in the space propagation part 200. Thereby, the signal lights inputted to the optical fibers 101a, 103a, 104a are interrupted by the interrupting plate 310, and only the signal light inputted to the optical fiber 102a is outputted through the space propagation part 200 and the optical fiber 102b.

As described above, in the array type space optical switch of the second embodiment, the interrupting plate 310 is configured so that photonic switching is performed once in all the pairs of optical fibers excluding the pair of the optical fibers 102a, 102b in a plurality of optical fibers.

(Third Embodiment)

Figure 6:
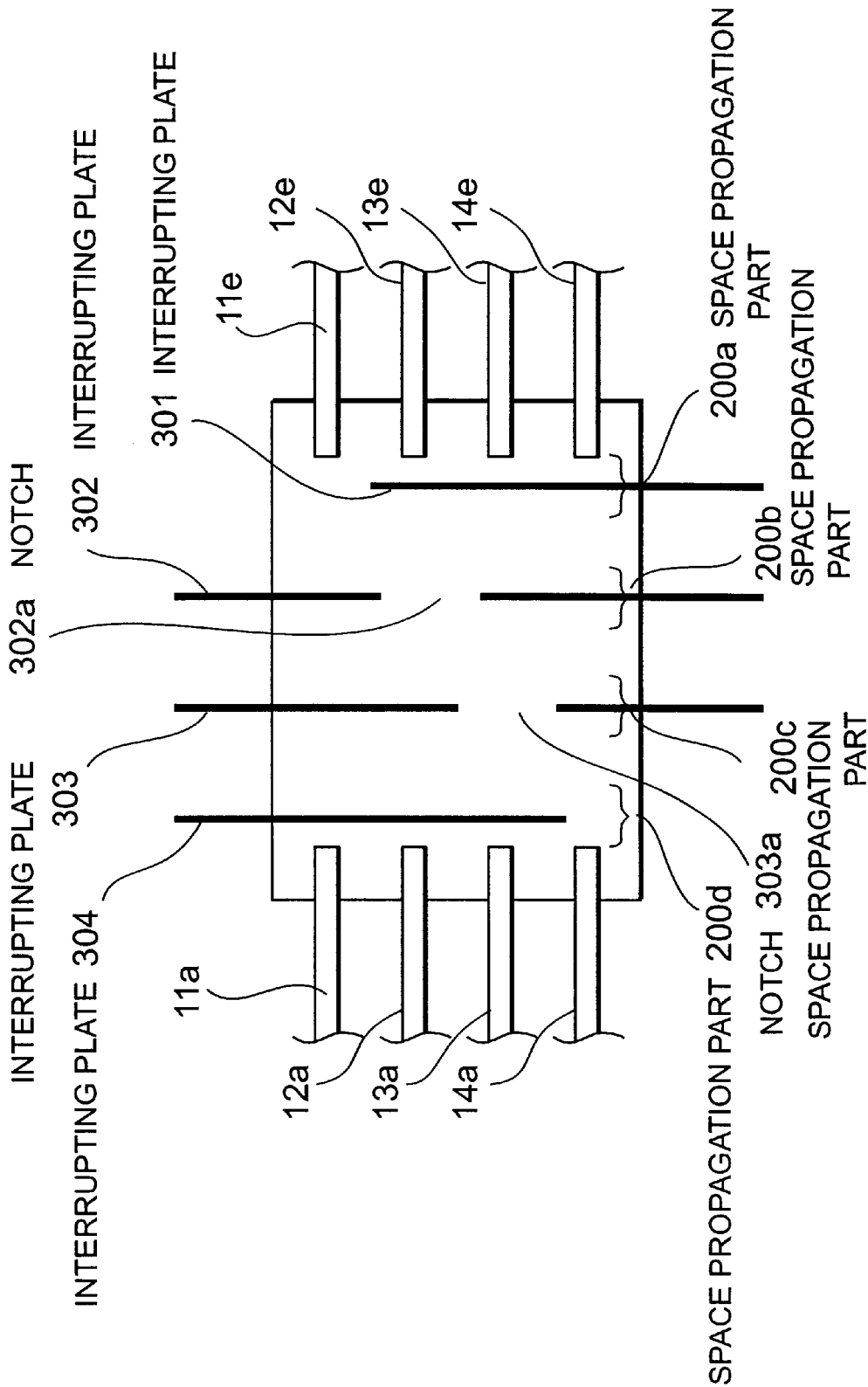
FIG. 6 is a diagram showing the constitution of the array type space optical switch according to a third embodiment of the present invention.

FIG. 6 is a diagram schematically showing the constitution of the array type space optical switch as the optical switch according to a third embodiment of the present invention. As shown in FIG. 6, the array type space optical switch of the third embodiment is provided with interrupting plates 301 to 304 to be inserted to the space propagation part or extracted from the space propagation part. By inserting the interrupting plate 301 to the space propagation part 200, the signal light is interrupted between optical fibers 12a and 12e, between optical fibers 13a and 13e, and between optical fibers 14a and 14e. On the other hand, the signal light is propagated between the optical fibers 11a and 11e via the space propagation part 200.

A notch part 302a is formed in the interrupting plate 302. When the interrupting plate 302 is inserted to the space propagation part 200, the notch part 302a is disposed in a position corresponding to a light propagation path between the optical fibers 12a and 12e. By inserting the interrupting plate 302 to the space propagation part 200, the signal light is interrupted between the optical fibers 11a and 11e, between the optical fibers 13a and 13e, and between the optical fibers 14a and 14e. On the other hand, the signal light is propagated between the optical fibers 12a and 12e via the space propagation part 200.

The interrupting plate 303 is inserted to the space propagation part 200. A notch part 303a is formed in the interrupting plate 303. When the interrupting plate 303 is inserted to the space propagation part 200, the notch part 303a is disposed in a position corresponding to a light propagation path between the optical fibers 13a and 13e. By inserting the interrupting plate 303 to the space propagation part 200, the signal light is interrupted between the optical fibers 11a and 11e, between the optical fibers 12a and 12e, and between the optical fibers 14a and 14e, and the signal light is propagated between the optical fibers 13b and 13c via a space propagation part 200c.

The interrupting plate 304 is inserted to the space propagation part 200. By inserting the interrupting plate 304 to the space propagation part 200, the signal light is interrupted between the optical fibers 11a and 11e, between the optical fibers 12a and 12e, and between the optical fibers 13a and 13e, and the signal light is propagated between the optical fibers 14a and 14e via the space propagation part 200.

A method of manufacturing the array type space optical switch 10 of the third embodiment is as follows. First, four optical fibers are prepared, and parts of the four optical fibers corresponding to the space propagation part 200 are removed to form the space propagation part 200. Subsequently, the array type space optical switch is provided with the interrupting plates 301 to 304 which can move in the direction perpendicular to the optical fibers.

In the third embodiment, the signal light of 1550 nm band is inputted to the array type space optical switch from each end surface of the optical fibers 11a to 14a on the opposite side of the optical fibers 11e to 14e. Here, when only the light inputted to the optical fiber 13a is outputted from the optical switch among the lights inputted to the optical fibers 11a to 14a, from the state in which the interrupting plate is not inserted to the space propagation part 200, the interrupting plate 303 is inserted. Thereby, the on state of the array type space optical switch to all the sets of the optical fibers is switched to the state in which only the signal light from the optical fiber 13a is outputted from the optical switch, because the outputs of the signal lights from the optical fibers 11a, 12a, 14a are interrupted by the interrupting plate 303. Similarly, by inserting either one of the interrupting plates 301, 302, 304 to the space propagation part 200, the light can be taken out of an arbitrary light output port in the optical switch.

As described above, in the array type space optical switch of the third embodiment, with respect to a plurality of sets of optical fibers, each set being constituted of a plurality of optical fibers for constituting one light transmission path, the photonic switching of all the sets of optical fibers excluding a specific set of optical fibers in a plurality of sets of optical fibers is performed. The array type space optical switch is provided with the interrupting plates 301 to 304 each of which corresponds to each set of the plurality of sets of optical fibers. Each of the interrupting plates 301 to 304 performs the photonic switching in all the sets of optical fibers excluding the set of optical fibers corresponding to each of the interrupting plates 301 to 304 among the plurality of sets of optical fibers.

(Fourth Embodiment)

Figure 7:
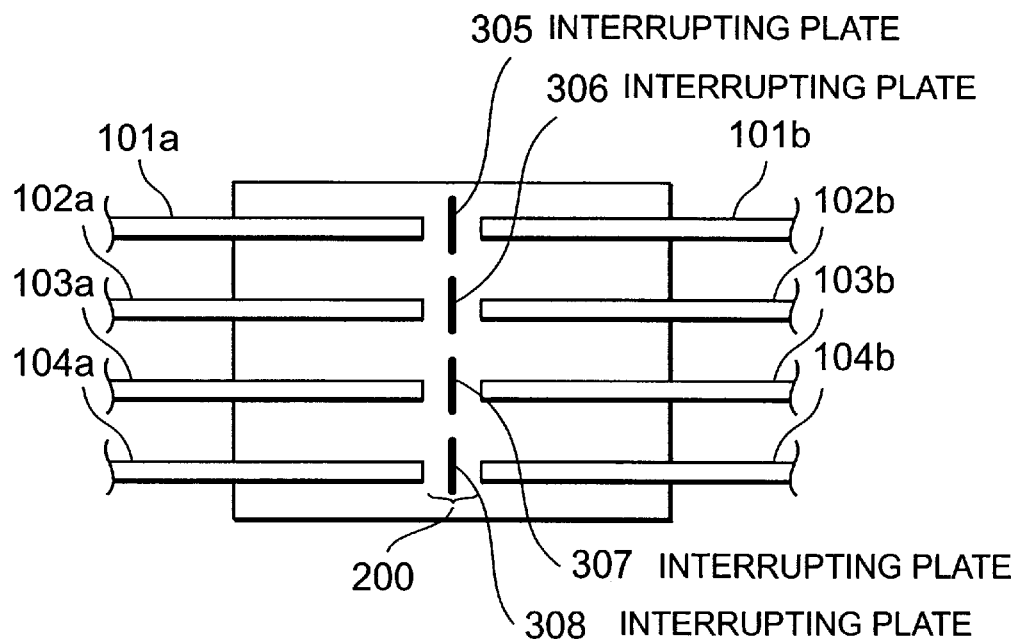
FIG. 7 is a diagram showing the constitution of the array type space optical switch according to a fourth embodiment of the present invention.

FIG. 7 is a schematic view showing the constitution of the array type space optical switch as the optical switch according to a fourth embodiment of the present invention. The array type space optical switch of the fourth embodiment is different from that of the first embodiment in the shape of the interrupting plate inserted in the space propagation part. In FIG. 7, the same constituting components as those of the first embodiment are denoted by the same reference numerals, and respects different from those of the first embodiment will mainly be described hereinafter.

As shown in FIG. 7, the array type space optical switch of the fourth embodiment is provided with an interrupting plate 305 for interrupting the light between the optical fibers 101a and 101b, an interrupting plate 306 for interrupting the light between the optical fibers 102a and 102b, and interrupting plate 307 for interrupting the light between the optical fibers 103a and 103b, and an interrupting plate 308 for interrupting the light between the optical fibers 104a and 104b, instead of the interrupting plate 300 used in the first embodiment.

When the light is interrupted between the optical fibers 101a and 101b, the interrupting plate 305 is inserted in a part between the optical fibers 101a and 101b in the space propagation part 200. When the light is interrupted between the optical fibers 102a and 102b, the interrupting plate 306 is inserted in a part between the optical fibers 102a and 102b in the space propagation part 200. When the light is interrupted between the optical fibers 103a and 103b, the interrupting plate 307 is inserted in a part between the optical fibers 103a and 103b in the space propagation part 200. When the light is interrupted between the optical fibers 104a and 104b, the interrupting plate 308 is inserted in a part between the optical fibers 104a and 104b in the space propagation part 200.

In the fourth embodiment, the signal light of 1550 nm band is inputted to the array type space optical switch from each end surface of the optical fibers 101a to 104a on the opposite side of the optical fibers 101e to 104e. Here, when the lights inputted to the optical fibers 102a, 103a are outputted from the optical switch among the lights inputted to the optical fibers 101a to 104a, the interrupting plates 305, 308 are inserted in the space propagation part 200. Thereby, the output light from the optical fiber 101a is interrupted by the interrupting plate 305, and the output light from the optical fiber 104a is interrupted by the interrupting plate 308. Thereby, the state is switched to the state in which only the signal lights from the optical fibers 102a, 103a are outputted from the optical switch. Similarly, by inserting either one of the interrupting plates to the space propagation part, the light can be taken out of an arbitrary light output port in the optical switch. In this case, the interrupting plates 305, 308 are inserted to the space propagation part 200, but by using appropriate driving force transmitting means for moving the interrupting plates 305, 308, a plurality of interrupting plates can simultaneously be moved by one switching driving. Therefore, by controlling each operation of the interrupting plates 305 to 308, the light can be taken out of the arbitrary light output port in the array type space optical switch of the fourth embodiment.

(Fifth Embodiment)

Figure 8:
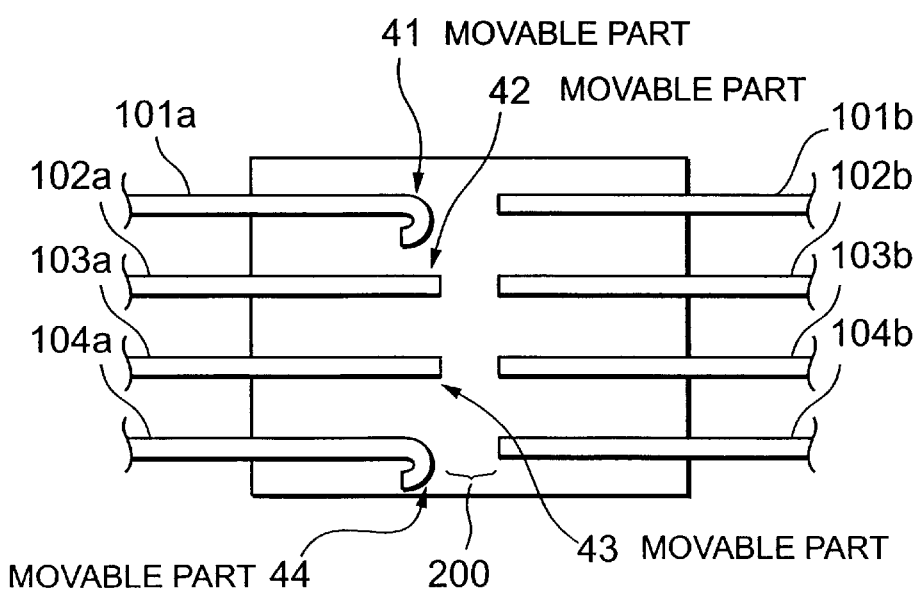
FIG. 8 is a diagram showing the constitution of the array type space optical switch according to a fifth embodiment of the present invention.

FIG. 8 is a schematic view showing the constitution of the array type space optical switch as the optical switch according to a fifth embodiment of the present invention. The array type space optical switch of the fifth embodiment is different from that of the first embodiment in that the photonic switching is performed in the space propagation part 200 by moving the end of the optical fiber without using the interrupting plate. In FIG. 8, the same constituting components as those of the first embodiment are denoted by the same reference numerals, and respects different from those of the first embodiment will mainly be described hereinafter.

As shown in FIG. 8, in the array type space optical switch of the fifth embodiment, the end of the optical fiber 101a on the side of the optical fiber 101b forms a movable part 41, and the end of the optical fiber 102a on the side of the optical fiber 102b forms a movable part 42. Moreover, the end of the optical fiber 103a on the side of the optical fiber 103b forms a movable part 43, and the end of the optical fiber 103a on the side of the optical fiber 103b forms a movable part 43, and the end of the optical fiber 104a on the side of the optical fiber 104b forms a movable part 44. The movable parts 41 to 44 are moved by moving means disposed on the array type space optical switch of the fifth embodiment.

Figure 9:
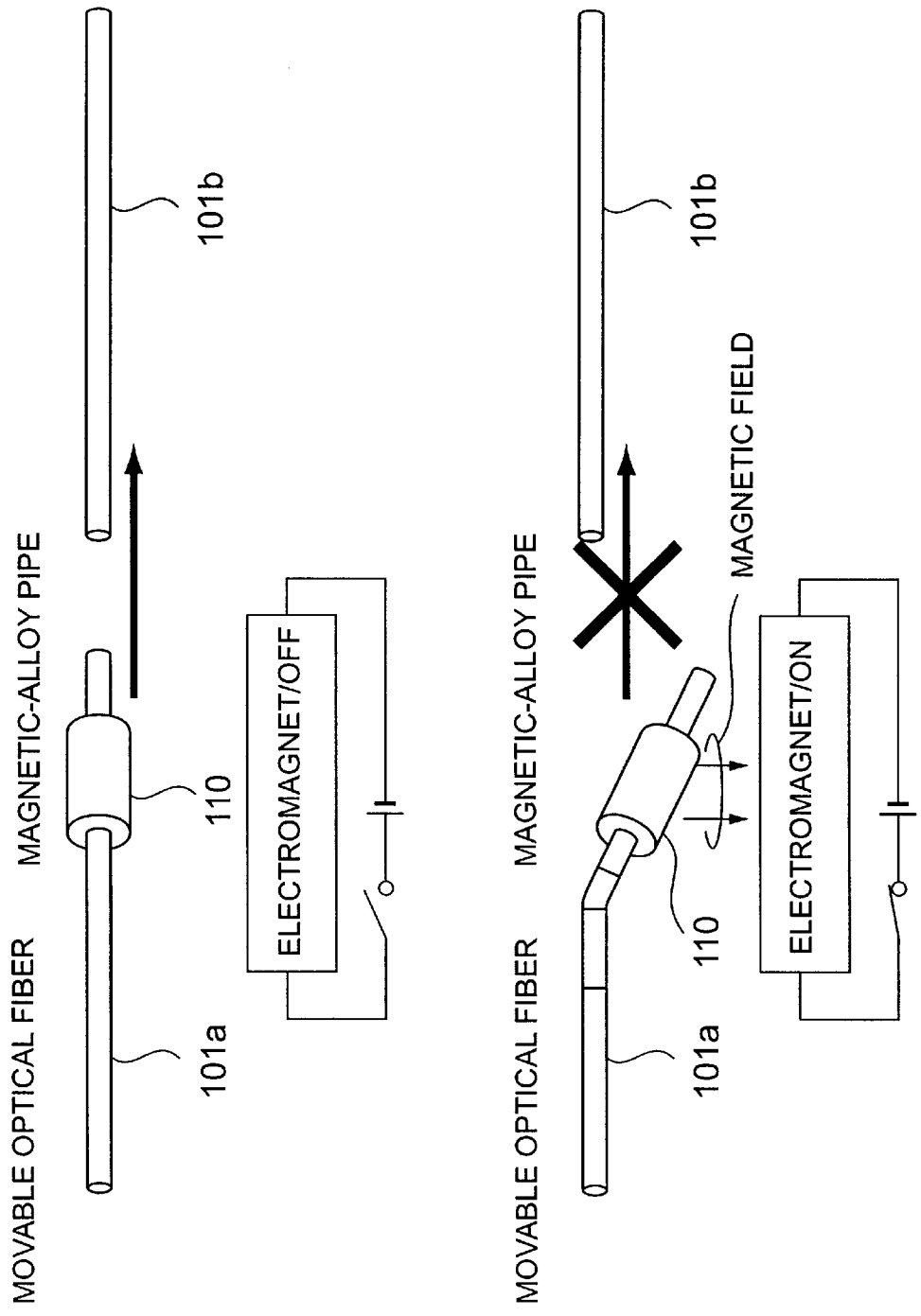
FIG. 9 is a diagram showing the constitution of a movable part 41.

Various constitutions can be applied to the moving means. Here, the utilization of a magnetic field will be described as one example. The constitution is shown in FIG. 9. In the constitution, a magnetic material 110 is applied to each end of the optical fibers 101a to 104a on the side of the space propagation part 200. An electromagnet is disposed so that the magnetic field acts on the magnetic member. When the electromagnet is not energized, that is, when there is no magnetic field, the lights outputted from the optical fibers 101a to 104a are coupled to the optical fibers 101b to 104b. On the other hand, when the electromagnet is energized, each end of the optical fibers 101a to 104a is deflected, and accordingly the output lights are not coupled to the optical fibers 101b to 104b. Specifically, by turning on/off the power to the electromagnet, the photonic switching can be performed.

In the fifth embodiment, the signal light of 1550 nm band is inputted to the array type space optical switch from each end surface of the optical fibers 101a to 104a on the opposite side of the optical fibers 101b to 104b. When the light inputted to the optical fiber 101a is transmitted to the optical fiber 101b through the space propagation part 200, the end surface of the movable part 41 is moved to be opposite to the end surface of the optical fiber 101b on the side of the optical fiber 101a by the moving means. Additionally, the optical axis of the movable part 41 is allowed to coincide with the optical axis of the end of the optical fiber 101b on the side of the optical fiber 101a.

When the optical coupling is released between the optical fibers 101a and 101b to obtain the off state, the movable part 41 is moved by the moving means so that the optical axis of the movable part 41 deviates from the optical axis of the end of the optical fiber 101b, and the signal light emitted from the end surface of the movable part 41 is emitted in a direction different from the direction toward the optical fiber 101b. The photonic switching can be performed between the optical fibers 101a and 101b by moving the movable part 41 in this manner.

Similarly, the photonic switching can be performed by moving the movable parts 42 to 44 by the moving means to control the optical space coupling also between the optical fibers 102a and 102b, between the optical fibers 103a and 103b, and between the optical fibers 104a and 104b.

Here, when the lights inputted to the optical fibers 102a, 103a among the lights inputted to the optical fibers 101a to 104a are outputted, the movable parts 41, 44 are moved by the moving means to release the optical coupling of the optical fibers 101a and 101b, and the optical coupling of the optical fibers 104a and 104b. Thereby, the state in which the array type space optical switch is on to all the pairs of the optical fibers is switched to the state in which the signal light outputs from the optical fibers 101a, 104a are interrupted and the signal lights from the optical fibers 102a, 103a are outputted.

In this case, the operation of the movable parts 41, 44 is controlled, but by using appropriate moving means to move the movable parts 41 to 44, a plurality of movable parts can simultaneously be controlled by one switch driving by the moving means. Therefore, by controlling the movable parts 41 to 44 by the moving means, the light can be taken out of the arbitrary light output port in the array type space optical switch of the fifth embodiment.

Moreover, the array type space optical switch may comprise a plurality of power transmitting means of the sets of the optical fibers for moving one end of the optical fiber in each set of optical fibers with respect to a plurality of sets of optical fibers. Thereby, the degree of freedom in selecting the optical fiber to be switched from the plurality of sets of optical fibers.

(Sixth Embodiment)

Figure 10:
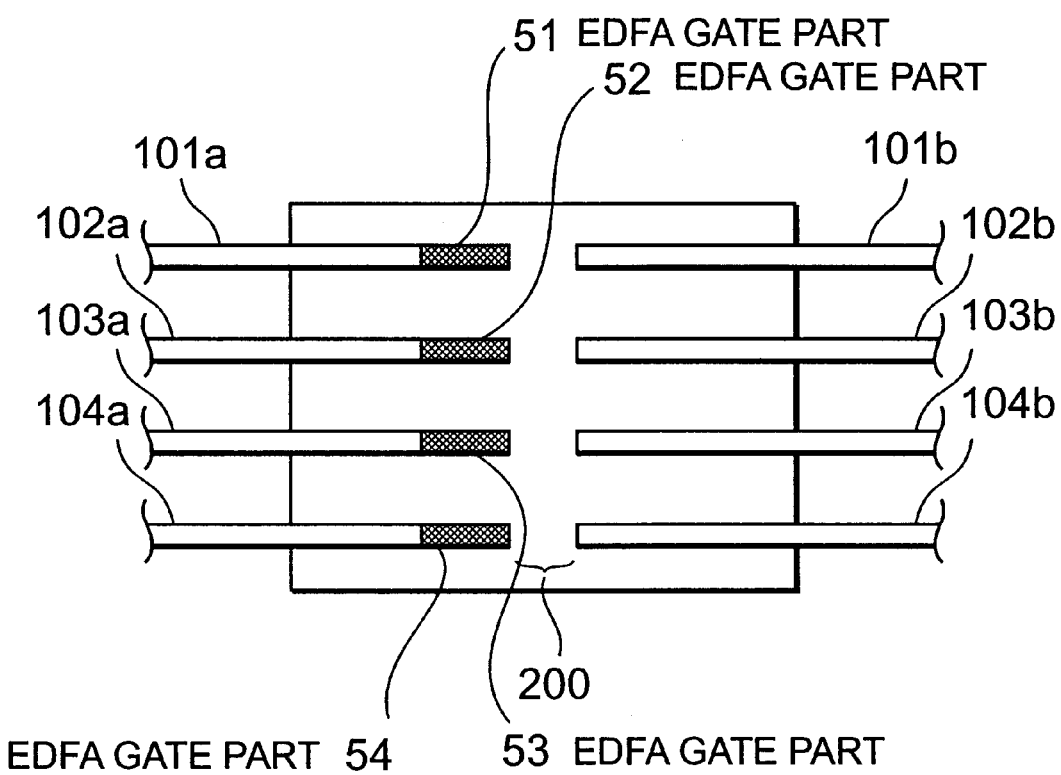
FIG. 10 is a diagram showing the constitution of the array type space optical switch according to a sixth embodiment of the present invention.

FIG. 10 is a schematic view showing the constitution of the array type space optical switch as the optical switch according to a sixth embodiment of the present invention. In FIG. 10, the same constituting components as those of the first embodiment are denoted by the same reference numerals. The array type space optical switch of the sixth embodiment is different from that of the first embodiment in that optical amplifiers formed on the ends of the optical fibers are used in performing the photonic switching in the space propagation part 200 without using any interrupting plate. The respects different from the first embodiment will mainly be described hereinafter.

As shown in FIG. 10, in the array type space optical switch of the sixth embodiment, erbium-doped fiber amplifier (EDFA) gate parts 51 to 54 are formed on the parts of the optical fibers 101a to 104a adjacent to the space propagation part 200. The EDFA gate parts 51 to 54 comprise erbium-doped fibers formed by doping erbium (Er) to the ends of the optical fibers. In each of these EDFA gate parts 51 to 54, by controlling the intensity of a pumping light injected to the EDFA gate part, the switching of the array type space optical switch in each set of optical fibers is performed.

In the sixth embodiment, the signal light of 1550 nm band is inputted to the array type space optical switch from each end surface of the optical fibers 101a to 104a on the opposite side of the optical fibers 101b to 104b. When the lights inputted to the optical fibers 102a, 103a among the lights inputted to the optical fibers 101a to 104a are outputted, the pumping lights inputted to the EDFA gate parts 51, 54 are interrupted. Thereby, the on state of the array type space optical switch to all the sets of optical fibers is switched to the state in which the outputs of the signal lights from the optical fibers 101a, 104a are interrupted by the EDFA gate parts 51, 54 and the signal lights from the optical fibers 102a, 103a are outputted.

In this case, the EDFA gate parts 51, 54 are controlled, but by using control means provided with appropriate pumping light transmitting means, a plurality of EDFA gate parts can simultaneously be controlled with one control to output the pumping lights. Therefore, the light can be taken out of the arbitrary light output port in the array type space optical switch of the sixth embodiment by using the control means to control the EDFA gate parts 51 to 54.

Since the light power loss in the optical switch can be compensated by using the erbium-doped optical fiber amplifier to perform the photonic switching in the array type space optical switch in this manner, there is an advantage that the margin of an input light power increases in a light receiver using the array type space optical switch.

The array type space optical switch of the sixth embodiment may be provided with control means for controlling all the EDFA gate parts 51 to 54 to perform one photonic switching in a plurality of sets of optical fibers, or control means for controlling the EDFA gate parts 51 to 54 to perform one photonic switching in all the sets of optical fibers excluding a specific set of optical fibers among the plurality of sets of optical fibers. Furthermore, there may be provided a plurality of driving means for the plurality of sets of optical fibers, so that each of the plurality of driving means controls the operation of the EDFA gate part in one set of optical fibers corresponding to the driving means to perform the photonic switching. In this case, the degree of freedom is widened in selecting the set of optical fibers in which the photonic switching is to be performed from the plurality of sets of optical fibers.

Moreover, instead of forming the EDFA gate parts 51 to 54 on the optical fibers 101a to 104a in the array type space optical switch of the sixth embodiment, a plurality of optical attenuators corresponding to the optical fibers 101a to 104a, or one optical attenuator may be used to perform the switching of the lights inputted to the optical fibers 101a to 104a.

(Seventh Embodiment)

Figure 11:
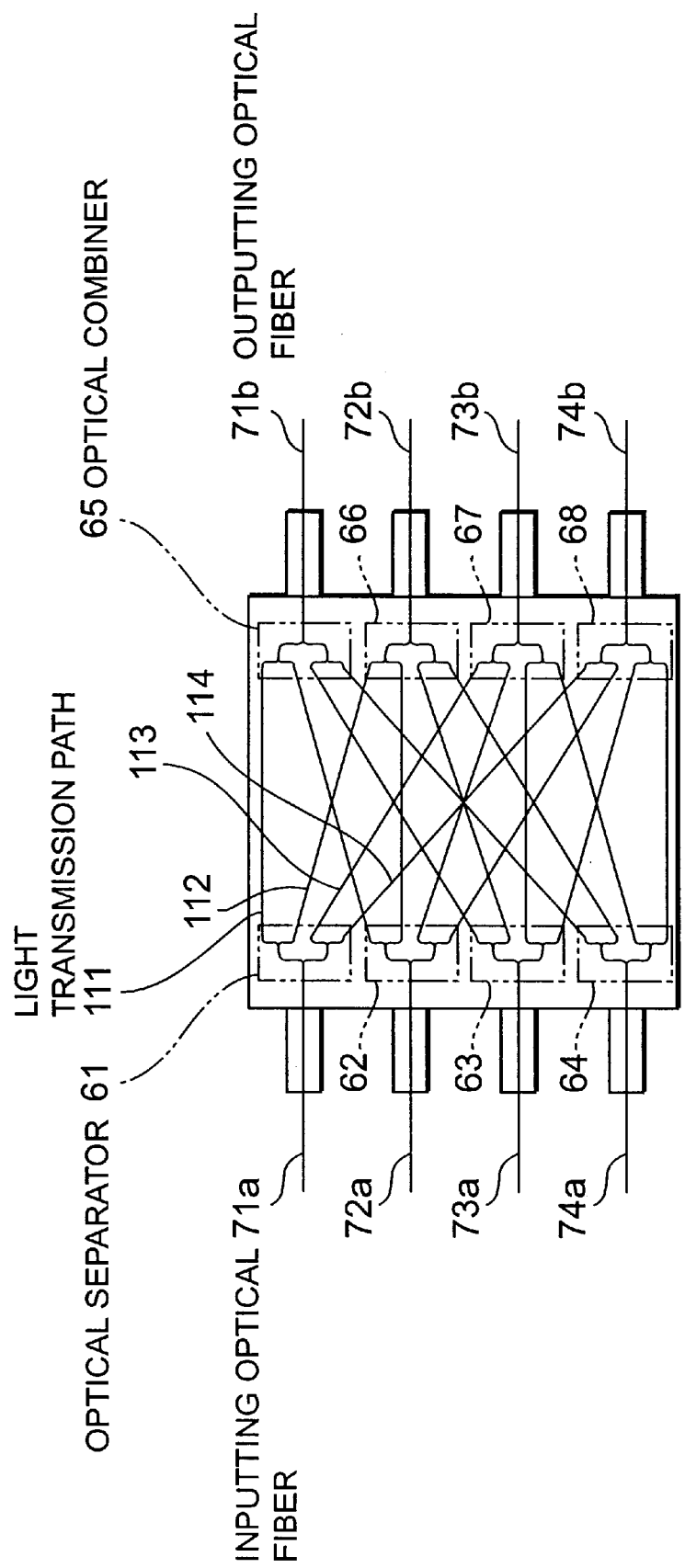
FIG. 11 is a diagram showing the constitution of a matrix type optical circuit to which an optical switch system is applied according. to a seventh embodiment of the present invention.

FIG. 11 is a schematic view showing the constitution of a matrix type optical circuit to which the optical switch system of a seventh embodiment of the present invention is applied. The optical circuit shown in FIG. 11 is a 4×4 matrix type optical circuit which comprises four light input ports and four light output ports. As shown in FIG. 11, inputting optical fibers 71a to 74a are attached to the light input ports, and outputting optical fibers 71b to 74b are attached to the light output ports. One end of the inputting optical fiber 71a on the side of the outputting optical fiber 71b is connected to an optical separator 61 which branches the input light to the inputting optical fiber 71a into light transmission paths 111 to 114. The light transmission paths 111 to 114 are constituted of a plurality of optical fibers and array type space optical switches as described later based on FIG. 12. Each end of the inputting optical fibers 72a to 74a on the side of the outputting optical fibers is also connected to optical separators 62 to 64 which branch the input lights to the inputting optical fibers into four light transmission paths.

On the other hand, one end of the outputting optical fiber 71b on the side of the inputting optical fiber 71a is connected to an optical combiner 65 which combines the lights from the four light transmission paths. The optical combiner 65 is connected to the light transmission path 111 out of the four light transmission paths branched by the optical separator 61, one of the four light transmission paths branched by the optical separator 62, one of the four light transmission paths branched by the optical separator 63, and one of the four light transmission paths branched by the optical separator 64. Therefore, each one of the four light transmission paths divided by the optical separators 61 to 64 is coupled by the optical combiner 65, and the light inputted to the four light transmission paths coupled by the optical combiner 65 is outputted to the outputting optical fiber 71b through the optical combiner 65.

Each one end of the outputting optical fibers 72b to 74b on the side of the inputting optical fibers is also connected to optical combiners 66 to 68 each of which couples each one of four light transmission paths branched by the optical separators 61 to 64. Thereby, the light inputted to the four light transmission paths combined by the optical combiner 66 is outputted to the outputting optical fiber 72b through the optical combiner 66. Moreover, the light inputted to the four light transmission paths combined by the optical combiner 67 is outputted to the outputting optical fiber 73b through the optical combiner 67, and the light inputted to the four light transmission paths combined by the optical combiner 68 is outputted to the outputting optical fiber 74b through the optical combiner 68.

Figure 12:
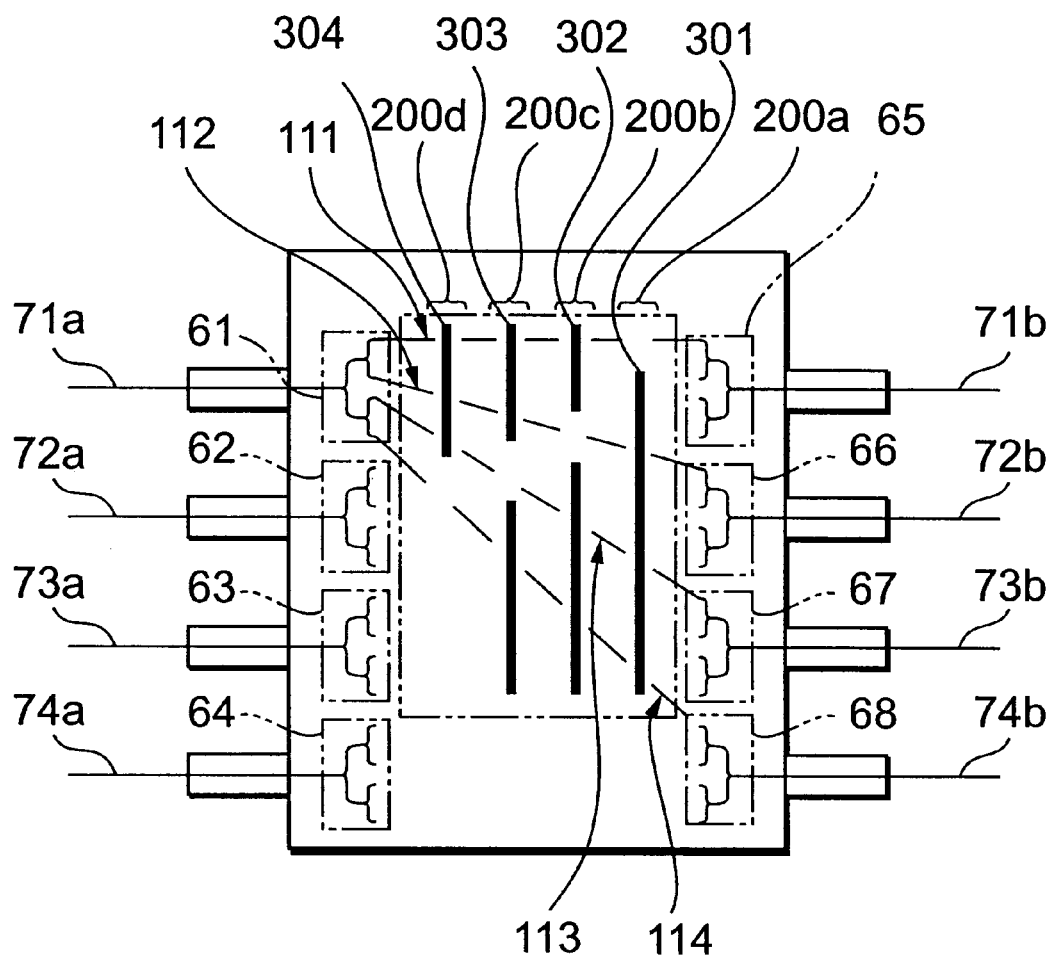
FIG. 12 is a diagram showing the constitution of an optical cross-connecting system according to the seventh embodiment of the present invention.

FIG. 12 is a schematic view showing the constitution of an optical cross-connecting system as the optical switch system of the seventh embodiment. As shown in FIG. 12, in the optical cross-connecting system of the seventh embodiment, used is the constitution similar to the constitution of the array type space optical switch of the third embodiment which has the movable interrupting plates 301 to 304. This optical cross-connecting system is provided with four switches with the constitution similar to that of the array type space optical switch of the third embodiment, and the array type space optical switches are disposed for the inputting optical fibers 71a to 74a, respectively. In FIG. 12, only one array type space optical switch for the inputting optical fiber 71a is shown.

Therefore, the light transmission paths 111 to 114 are constituted of a plurality of optical fibers and space propagation parts 200a to 200d. The interrupting plate 301 is inserted to the space propagation part 200a to interrupt the lights propagated in the light transmission paths 112 to 114. The interrupting plate 302 is inserted to the space propagation part 200b to interrupt the lights propagated in the light transmission paths 111, 113, 114. The interrupting plate 303 is inserted to the space propagation part 200c to interrupt the lights propagated in the light transmission paths 111, 112, 114. The interrupting plate 304 is inserted to the space propagation part 200d to interrupt the lights propagated in the light transmission paths 111 to 113.

In the optical cross-connecting system of the seventh embodiment, the signal light of 1550 nm band is inputted from each end surface of the inputting optical fibers 71a to 74a on the opposite side of the optical separators. For example, no interrupting plate is inserted in the space propagation parts 200a to 200d, the light inputted to the inputting optical fiber 71a is separated to the light transmission paths 111 to 114 by the optical separator 61. The light inputted to the light transmission path 111 is outputted to the outputting optical fiber 71b through the optical combiner 65, and the light inputted to the light transmission path 112 is outputted to the outputting optical fiber 72b through the optical combiner 66. Moreover, the light inputted to the light transmission path 113 is outputted to the outputting optical fiber 73b through the optical combiner 67, and the light inputted to the light transmission path 114 is outputted to the outputting optical fiber 73n through the optical combiner 68.

For the operation in the optical cross-connecting system of the seventh embodiment, for example, when the signal light inputted to the inputting optical fiber 71a out of the four inputting optical fibers is outputted from the outputting optical fiber 73b out of the four outputting optical fibers, the interrupting plate 303 is inserted to the space propagation part 200c from the state in which no interrupting plate is inserted to the space propagation parts 200a to 200d. In this case, the light inputted to the inputting optical fiber 71a is separated to the light transmission paths 111 to 114 via the optical separator 61. Here, since the interrupting plate 303 is inserted, only the light inputted to the light transmission path 113 among the lights inputted to the light transmission paths 111 to 114 is outputted from the outputting optical fiber 73b via the notch part of the interrupting plate 303 and the optical combiner 67. The lights inputted to the light transmission paths 111, 112, 114 are interrupted by the interrupting plate 303, and the signal light inputted to the inputting optical fiber 71a is not outputted from the outputting optical fibers 71b, 72b, 74b.

Therefore, when the interrupting plate 303 is inserted to the space propagation part 200c, the on state of the array type space optical switch to all the light transmission paths 111 to 114 is switched to the state in which the lights propagated to the light transmission paths 111, 112, 114 are interrupted and only the light propagated to the light transmission path 113 is outputted from the optical cross-connecting system through the outputting optical fiber 73b. Similarly, when either one of the interrupting plates 301, 302, 304 is inserted to the space propagation part, the signal light inputted to the inputting optical fiber 71a can be taken out of the arbitrary light output port of the optical cross-connecting system.

Similarly to the above-described light transmission paths between the inputting optical fiber 71a and the outputting optical fibers 71b to 74b, the light transmission paths between each of the inputting optical fibers 72a to 74a and the outputting optical fibers 71b to 74b are constituted by using the optical switch with the constitution similar to that of the array type space optical switch of the third embodiment. Thereby, since the arbitrary light input and output ports in the optical cross-connecting system can optically be coupled, the matrix type optical switch can be realized so that the light transmission path can be switched with one switch driving.

(Eighth Embodiment)

Figure 13:
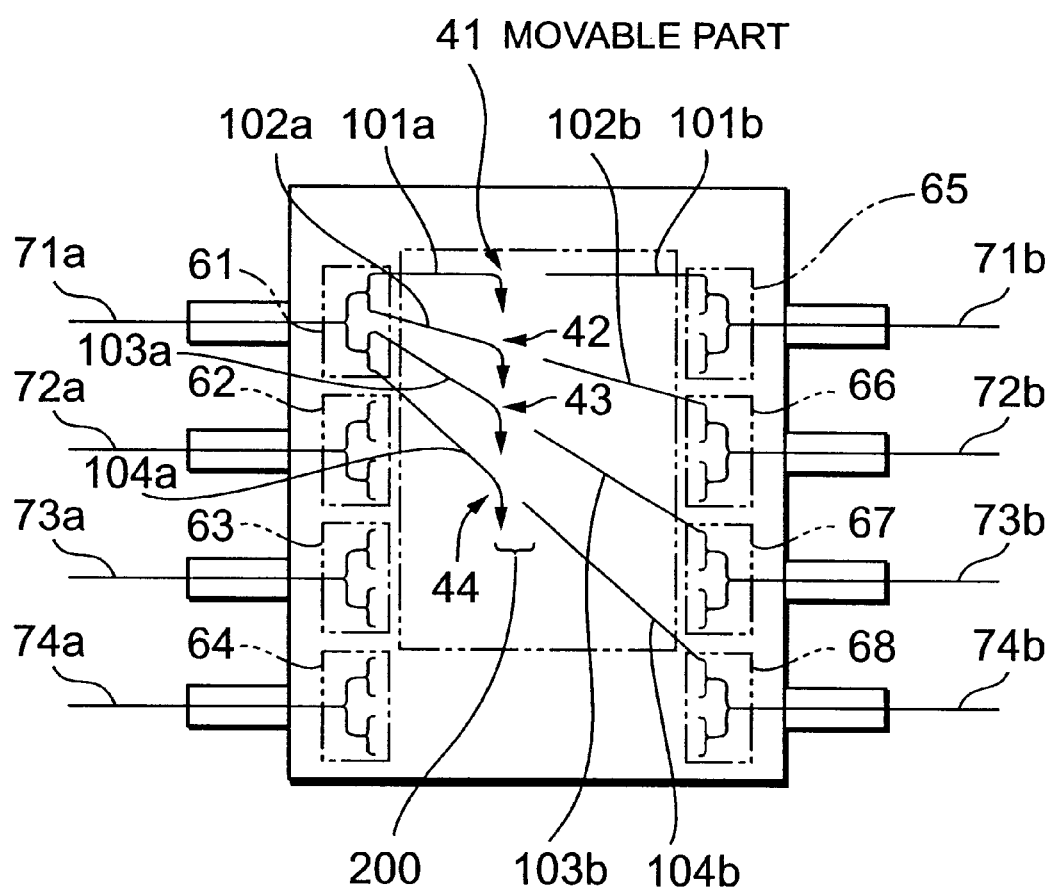
FIG. 13 is a diagram showing the constitution of the optical cross-connecting system according to an eighth embodiment of the present invention.

FIG. 13 is a schematic view showing the constitution of the optical cross-connecting system as the optical switch system of an eighth embodiment of the present invention. As shown in FIG. 13, the same constituting components as those of the fifth and seventh embodiments are denoted with the same reference numerals. The optical cross-connecting system of the eighth embodiment is different from that of the seventh embodiment in that instead of the array type space optical switch using the interrupting plate in the seventh embodiment, the array type space optical switch of the fifth embodiment using the EDFA gate parts formed on the ends of the optical fibers is disposed. The respects different from the fifth and seventh embodiments will mainly be described hereinafter.

As shown in FIG. 13, in the optical cross-connecting system of the eighth embodiment, the input light to the inputting optical fiber 71a is branched by the optical separator 61 into the light transmission path constituted of the optical fibers 101a and 101b, the light transmission path constituted of the optical fibers 103a and 103b, and the light transmission path constituted of the optical fibers 104a and 104b. The array type space optical switch is inserted to these light transmission paths. In the same manner as the third embodiment, the array type space optical switch is constituted of the space propagation part 200 between two optical fibers in each set of optical fibers, and the movable parts 41 to 44 disposed on the ends of the optical fibers 101a to 104a on the side of the space propagation part 200.

Each end of the optical fibers 101a to 104a on the opposite side of the space propagation part 200 is connected to the optical separator 61. The end of the optical fiber 101b on the opposite side of the space propagation part 200 is connected to the optical combiner 65, and the end of the optical fiber 102b on the opposite side of the space propagation part 200 is connected to the optical combiner 66. Moreover, the end of the optical fiber 103b on the opposite side of the space propagation part 200 is connected to the optical combiner 67, and the end of the optical fiber 104b on the opposite side of the space propagation part 200 is connected to the optical combiner 68.

The optical cross-connecting system of the eight embodiment is provided with four 4×4 array type space optical switches constituted as described above. The array type space optical switches correspond to the inputting optical fibers 71a to 74a, respectively. In FIG. 13, only the array type space optical switch corresponding to the optical separator 61 is shown. Also in the optical cross-connecting system of the eight embodiment, in the same manner as the fifth embodiment, the photonic switching is performed by moving the ends of the optical fibers to control the optical space coupling between the optical fibers.

In the optical cross-connecting system of the eighth embodiment, the signal light of 1550 nm band is inputted from each end surface of the inputting optical fibers 71a to 74a on the opposite side of the optical separator. For example, when the signal light inputted to the inputting optical fiber 71a is outputted from the outputting optical fiber 73b, the moving means is used to move the movable parts 41, 42, 44, and the optical coupling of the optical fibers 101a and 101b, optical coupling of the optical fibers 102a and 102b, and optical coupling of the optical fibers 104a and 104b are released. In this case, the light inputted to the inputting optical fiber 71a is separated to the light transmission paths 101a to 104a via the optical separator 61, but by releasing the optical coupling by the movable parts 41, 42, 44 as described above, the outputs of the signal lights from the optical fibers 101a, 102a, 104a are interrupted. Additionally, the state is switched to the state in which the signal light from the optical fiber 103a is outputted to the optical fiber 103b via the space propagation part 200. The light inputted to the optical fiber 103b from the optical fiber 103a is outputted to the outputting optical fiber 73b via the optical combiner 67.

In this operation, three movable parts 41, 42, 44 are controlled. However, in the same manner as in the fifth embodiment, by using appropriate moving means for moving the movable parts 41 to 44, a plurality of movable parts can simultaneously be controlled with one switch driving. Therefore, when the movable parts 41 to 44 are controlled by the control means, the light can be taken out of the arbitrary light output port in the optical cross-connecting system of the eighth embodiment. Moreover, even in the light transmission path between the optical separator 62 and each of the optical combiners 65 to 68, light transmission path between the optical separator 63 and each of the optical combiners 65 to 68, and light transmission path between the optical separator 64 and each of the optical combiners 65 to 68, by connecting the light input and output ports with the constitution similar to the light transmission path between the optical separator 61 and each of the optical combiners 65 to 68, the matrix type optical switch can be realized so that the light transmission path can be switched with one switch driving.

(Ninth Embodiment)

Figure 14:
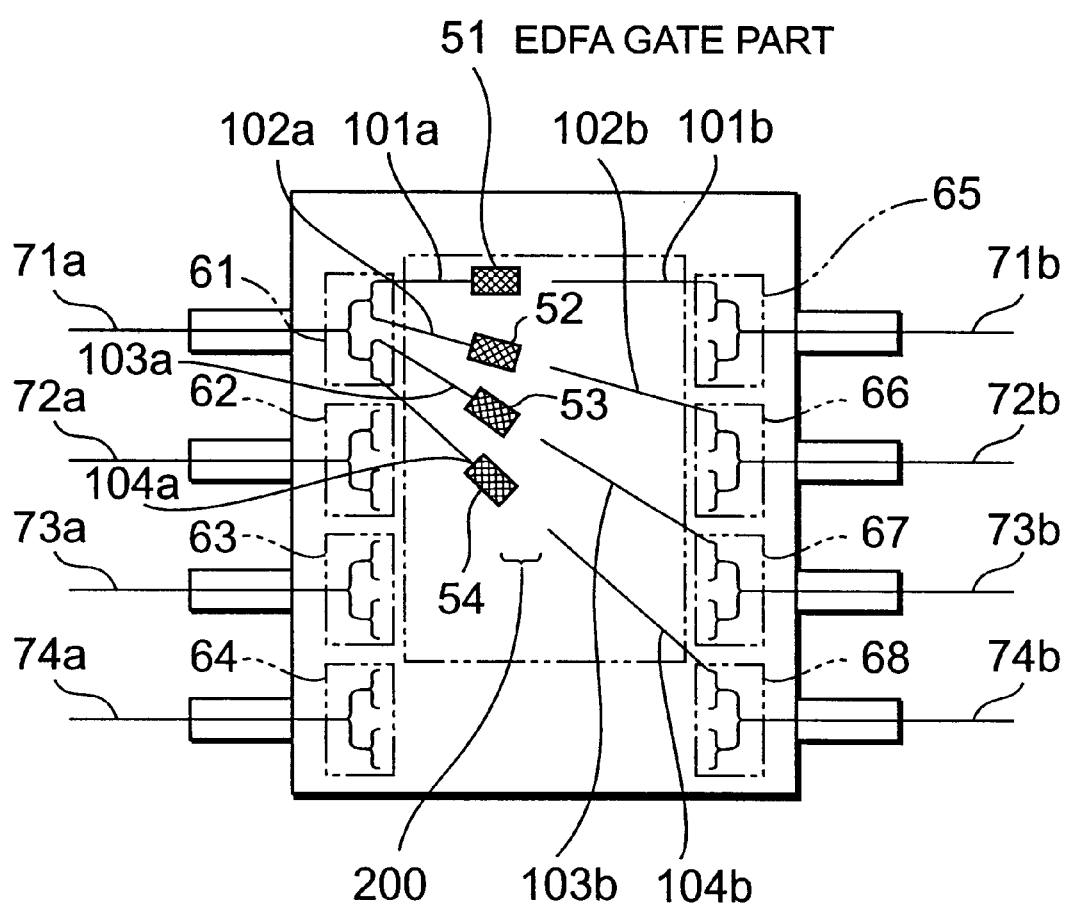
FIG. 14 is a diagram showing the constitution of the optical cross-connecting system according to a ninth embodiment of the present invention.

FIG. 14 is a schematic view showing the constitution of the optical cross-connecting system as the optical switch system of a ninth embodiment of the present invention. In FIG. 14, the same constituting components as those of the sixth and eighth embodiments are denoted with the same reference numerals. For the optical cross-connecting system of the ninth embodiment, in the optical cross-connecting system of the eight embodiment, instead of the array type space optical switch of the fifth embodiment, the array type space optical switch of the sixth embodiment is used. Therefore, the optical cross-connecting system of the ninth embodiment is different from that of the eight embodiment in that the photonic switching is performed using the EDFA gate parts formed on the ends of the optical fibers, instead of moving the end of the optical fiber in the optical switch between the optical separator and the optical combiner. The respects different from the sixth and eighth embodiments will mainly be described hereinafter.

As shown in FIG. 14, in the optical cross-connecting system of the ninth embodiment, similarly to the sixth embodiment, the EDFA gate part 51 is formed in the part of the optical fiber 101a adjacent to the space propagation part 200, and the EDFA gate part 52 is formed in the part of the optical fiber 102a adjacent to the space propagation part 200. Moreover, the EDFA gate part 53 is formed in the part of the optical fiber 103a adjacent to the space propagation part 200, and the EDFA gate part 54 is formed in the part of the optical fiber 104a adjacent to the space propagation part 200. Even in the optical cross-connecting system of the ninth embodiment, the EDFA gate parts 51 to 54 are utilized as the optical switches, and by controlling the intensity of pumping light injected to each of the EDFA gate parts 51 to 54, the turning on/off of the light emitted from the EDFA gate part is controlled.

In the optical cross-connecting system of the ninth embodiment, the signal light of 1550 nm band is inputted from the end surface of each of the inputting optical fibers 71a to 74a on the opposite side of the optical separator. For example, when the signal light inputted to the inputting optical fiber 71a is outputted from the outputting optical fiber 73b, the pumping lights to the EDFA gate parts 51, 52, 54 are interrupted from the state in which the pumping lights are inputted to the EDFA gate parts 51 to 54. In this case, the light inputted to the inputting optical fiber 71a is separated to the light transmission paths 101a to 104a via the optical separator 61, but by interrupting the pumping lights to the EDFA gate parts 51, 52, 54, the signal lights inputted to the optical fibers 101a, 102a, 104a are interrupted by the EDFA gate parts 51, 52, 54. Additionally, the state is switched to the state in which the signal light from the optical fiber 103a is outputted to the optical fiber 103b via the space propagation part 200. The light inputted to the optical fiber 103b from the optical fiber 103a is outputted to the outputting optical fiber 73b via the optical combiner 67.

In this operation, three EDFA gate parts 51, 52, 54 are controlled. A plurality of EDFA gate parts can simulta- neously be controlled with one control to emit the pumping lights by using the control means provided with the appropriate pumping light transmitting means. Therefore, when the control means is used to control the EDFA gate parts 51 to 54, the light can be taken out of the arbitrary light output port in the array type space optical switch of the ninth embodiment. Moreover, even in the light transmission path between the optical separator 62 and each of the optical combiners 65 to 68, light transmission path between the optical separator 63 and each of the optical combiners 65 to 68, and light transmission path between the optical separator 64 and each of the optical combiners 65 to 68, by connecting the light input and output ports with the constitution similar to that of the light transmission path between the optical separator 61 and each of the optical combiners 65 to 68, the matrix type optical switch can be realized so that the light transmission path can be switched with one switch driving.

(Tenth Embodiment)

Figure 15:
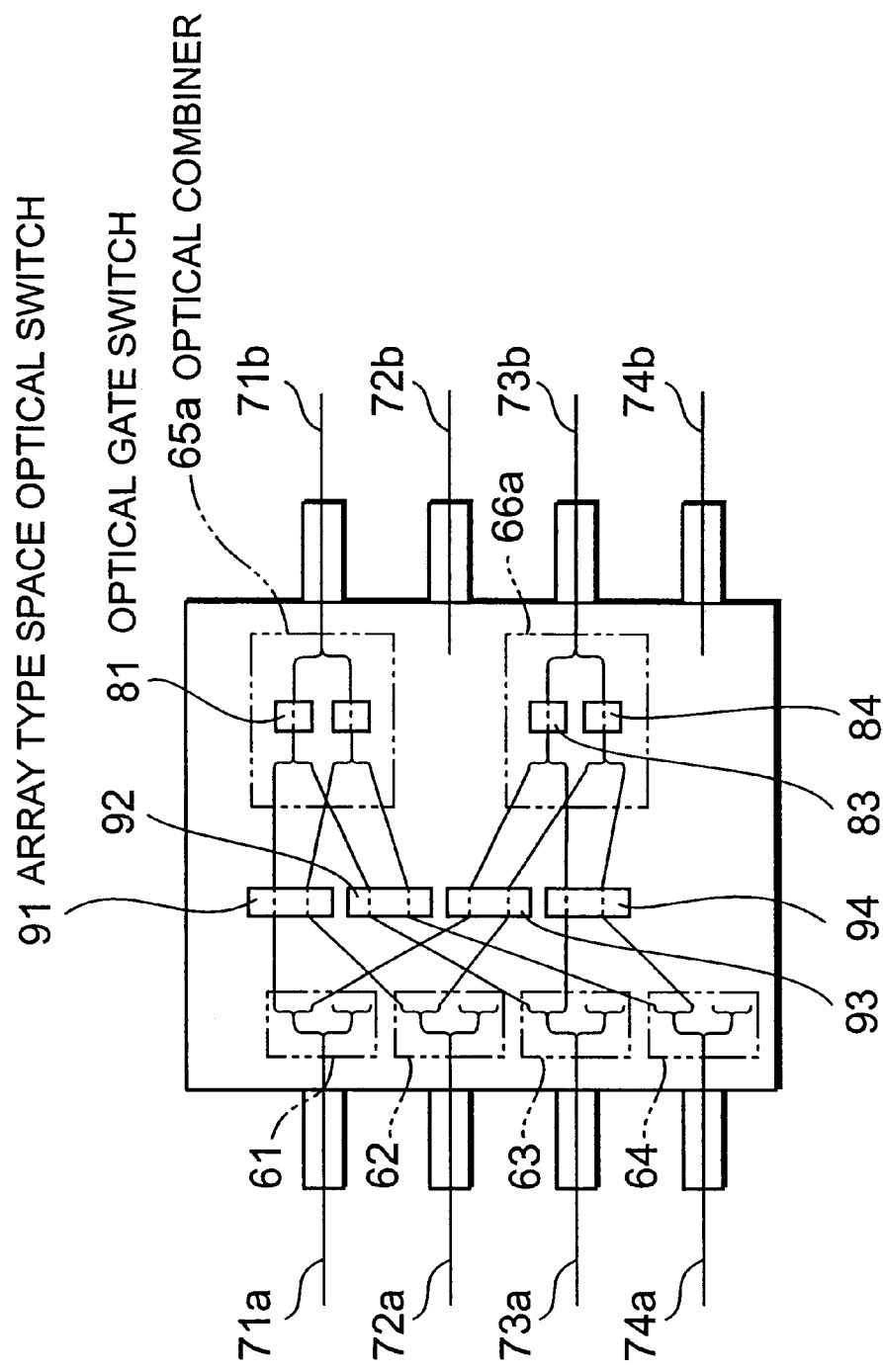
FIG. 15 is a diagram showing the constitution of the optical cross-connecting system according to a tenth embodiment of the present invention.

FIG. 15 is a schematic view showing the constitution of the optical cross-connecting system as the optical switch system of a tenth embodiment of the present invention. In FIG. 15, the same constituting components as those of the seventh embodiment are denoted with the same reference numerals. The optical cross-connecting system of the ninth embodiment is different from the seventh embodiment in the array type space optical switch and the optical combiner. The optical combiner of the tenth embodiment is provided with an optical gate switch. The respects different from the seventh embodiment will mainly be described.

As shown in FIG. 15, the optical cross-connecting system of the tenth embodiment is provided with array type space optical switches 91, 92, 93, 94. The array type space optical switch 91 performs the photonic switching in the light transmission path between each of the optical separators 61, 62 and the outputting optical fiber 71b, and the array type space optical switch 92 performs the photonic switching in the light transmission path between each of the optical separators 63, 64 and the outputting optical fiber 71b. The array type space optical switch 93 performs the photonic switching in the light transmission path between each of the optical separators 61, 62 and the outputting optical fiber 73b. The array type space optical switch 94 performs the photonic switching in the light transmission path between each of the optical separators 63, 64 and the outputting optical fiber 73b. Each of the array type space optical switches 91 to 94 is a 2×2 array type space optical switch which has two light input ports and two light output ports.

Each of the array type space optical switches 91 to 94 has a constitution similar to that of either one of the array type space optical switch using the interrupting plate as in the first embodiment, the array type space optical switch for moving the optical fiber end as in the fifth embodiment, and the array type space optical switch using the EDFA gate part as in the sixth embodiment. Even when either one is used, the photonic switching is simultaneously performed in two light transmission paths with one switching operation in these array type space optical switches 91 to 94.

Moreover, the optical cross-connecting system of the tenth embodiment is provided with an optical combiner 65a as an optical coupler for coupling four light transmission paths extended from the light output ports of the array type space optical switches 91, 92 into one, and an optical combiner 66a as the optical coupler for coupling four light transmission paths extended from the light output ports of the array type space optical switches 93, 94 into one. The optical combiner 65a is provided with optical gate switches 81, 82, and the optical combiner 66a is provided with optical gate switches 83, 84.

One of four light output ports of the optical separator 61 on the opposite side of the inputting optical fiber 71a is connected to one light input port of the array type space optical switch 91 via the optical fiber, and the other one of the four light output ports of the optical separator 61 is connected to one light input port of the array type space optical switch 93 via the optical fiber. One of four light output ports of the optical separator 62 on the opposite side of the inputting optical fiber 72a is connected to the other light input port of the array type space optical switch 91 via the optical fiber, and the other one of the four light output ports of the optical separator 62 is connected to the other light input port of the array type space optical switch 93 via the optical fiber.

One of four light output ports of the optical separator 63 on the opposite side of the inputting optical fiber 73a is connected to one light input port of the array type space optical switch 92 via the optical fiber, and the other one of the four light output ports of the optical separator 63 is connected to one light input port of the array type space optical switch 94 via the optical fiber. One of four light output ports of the optical separator 64 on the opposite side of the inputting optical fiber 74a is connected to the other light input port of the array type space optical switch 92 via the optical fiber, and the other one of the four light output ports of the optical separator 64 is connected to the other light input port of the array type space optical switch 94 via the optical fiber.

The optical combiner 65a couples the light passed from the inputting optical fiber 71a via the optical separator 61 and the array type space optical switch 91, the light passed from the inputting optical fiber 72a via the optical separator 62 and the array type space optical switch 91, the light passed from the inputting optical fiber 73a via the optical separator 63 and the array type space optical switch 92, and the light passed from the inputting optical fiber 74a via the optical separator 64 and the array type space optical switch 92. The light coupled by the optical combiner 65a is outputted to the outputting optical fiber 71b. Moreover, the optical combiner 66a couples the light passed from the inputting optical fiber 71a via the optical separator 61 and the array type space optical switch 93, the light passed from the inputting optical fiber 72a via the optical separator 62 and the array type space optical switch 93, the light passed from the inputting optical fiber 73a via the optical separator 63 and the array type space optical switch 94, and the light passed from the inputting optical fiber 74a via the optical separator 64 and the array type space optical switch 94. The light coupled by the optical combiner 66a is outputted to the outputting optical fiber 73b.

The optical gate switch 81 disposed on the optical combiner 65a performs the photonic switching of the light obtained by coupling the light transmitted from the inputting optical fiber 71a via the optical separator 61 and array type space optical switch 91 and the light transmitted from the inputting optical fiber 73a via the optical separator 63 and the array type space optical switch 92. The optical gate switch 82 performs the photonic switching of the light obtained by coupling the light transmitted from the inputting optical fiber 72a via the optical separator 62 and array type space optical switch 91 and the light transmitted from the inputting optical fiber 74a via the optical separator 64 and the array type space optical switch 92.

The optical gate switch 83 disposed on the optical combiner 66a performs the photonic switching of the light obtained by coupling the light transmitted from the inputting optical fiber 71a via the optical separator 61 and array type space optical switch 93 and the light transmitted from the inputting optical fiber 73a via the optical separator 63 and the array type space optical switch 94. The optical gate switch 84 performs the photonic switching of the light obtained by coupling the light transmitted from the inputting optical fiber 72a via the optical separator 62 and array type space optical switch 93 and the light transmitted from the inputting optical fiber 74a via the optical separator 64 and the array type space optical switch 94.

Similarly to the light transmission paths between each of the inputting optical fibers 71a to 74a and the outputting optical fibers 71b, 73b, the light transmission path between each of the inputting optical fibers 71a to 74a and the outputting optical fiber 72b, and the light transmission path between each of the inputting optical fibers 71a to 74a and the outputting optical fiber 74b are constituted of the optical separators 61 to 64, array type space optical switches, optical combiners provided with the optical gate switches, and a plurality of optical fibers for connecting these components.

In the optical cross-connecting system of the tenth embodiment, the signal light of 1550 nm band is inputted from each end surface of the inputting optical fibers 71a to 74a on the opposite side of the optical separator. For example, when the signal light inputted to the inputting optical fiber 71a is outputted from the outputting optical fiber 71b, the array type space optical switch 91 is turned on, the array type space optical switch 92 is turned off, the optical gate switch 81 is turned on, and the optical gate switch 82 is turned off. Thereby, the inputting optical fiber 71a and the outputting optical fiber 71b are optically coupled via the optical separator 61, array type space optical switch 91 and optical combiner 65a, and the light inputted to the inputting optical fiber 71a is outputted to the outputting optical fiber 71b without mixing with the lights from the inputting optical fibers 72a to 74a.

Similarly to the operation of the above-described optical cross-connecting system, the complete driving of the 4×4 matrix type optical switch is realized by performing the switching operation of the array type space optical switch and optical gate switch to the other light input and output ports.

In the optical cross-connecting system of the tenth embodiment, each optical combiner is provided with the optical gate switch, but the optical cross-connecting system which can perform the above-described switching operation may be constituted by provided the optical separator, not the optical combiner, with the optical gate switch.

(Eleventh Embodiment)

Figure 16:
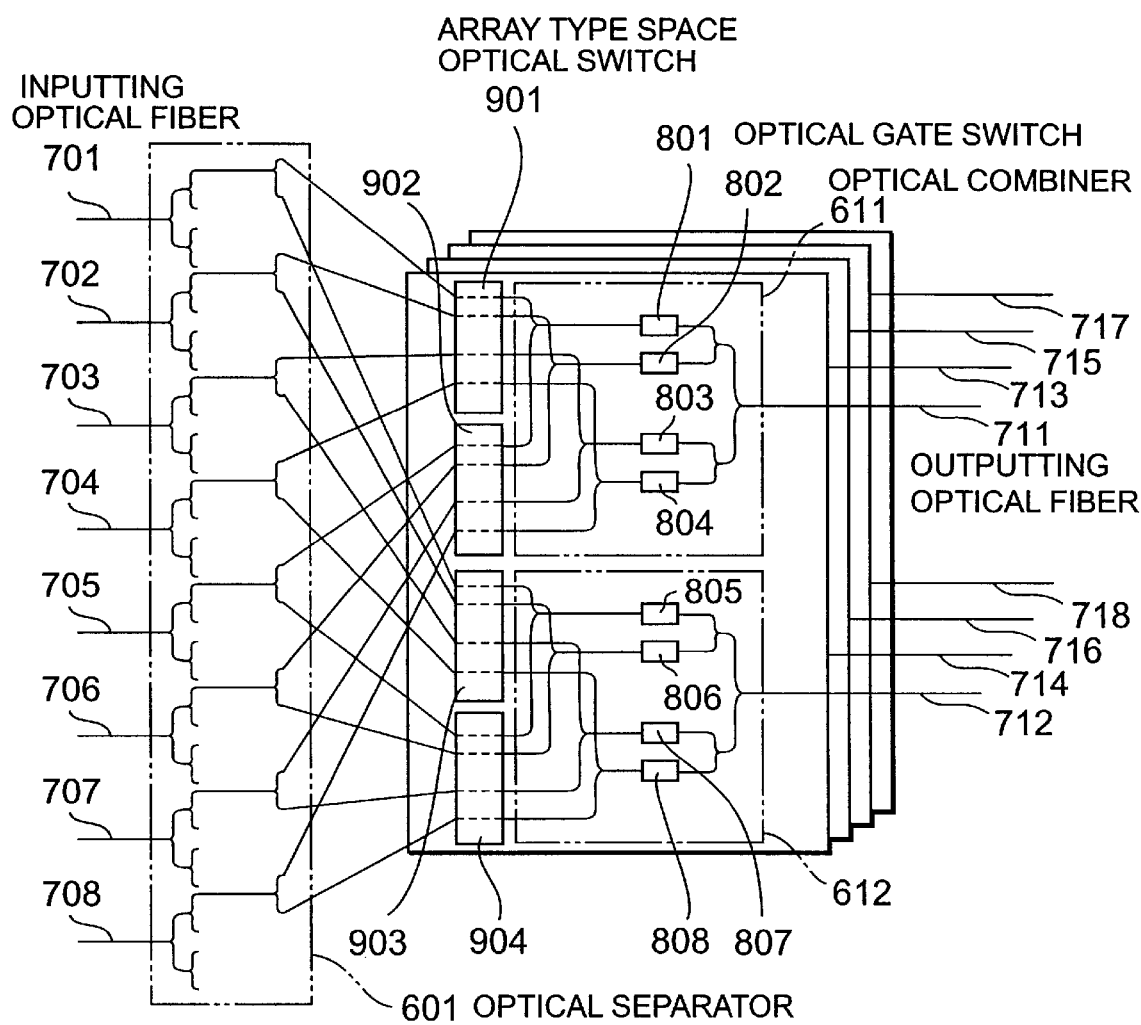
FIG. 16 is a diagram showing the constitution of the optical cross-connecting system according to an eleventh embodiment of the present invention.

FIG. 16 is a schematic view showing the constitution of the optical cross-connecting system as the optical switch system of an eleventh embodiment of the present invention. The optical cross-connecting system of the eleventh embodiment is an 8×8 matrix type optical switch which has eight light input ports and eight light output ports.

In the optical cross-connecting system of the eleventh embodiment, as shown in FIG. 16, inputting optical fibers 701 to 708 are attached to the light input ports. Outputting optical fibers 711 to 718 are attached to the light output ports. Each one end of the inputting optical fibers 701 to 708 is connected to an optical separator 601 as an optical branch unit. For the inputting optical fibers 701 to 708, the optical separator 601 branches the light inputted to one of the inputting optical fibers 701 to 708 to eight transmission lines in correspondence with the number of outputting optical fibers. In FIG. 16, a part of the optical separator 601 corresponding to the inputting optical fibers 701 to 708 is omitted.

Moreover, the optical cross-connecting system of the eleventh embodiment is provided with array type space optical switches 901, 902 for performing the photonic switching in the light transmission path between the optical separator 601 and the outputting optical fiber 711, and array type space optical switches 903, 904 for performing the photonic switching between the optical separator 601 and the outputting optical fiber 712. Each of the array type space optical switches 901 to 904 is a 4×4 array type space optical switch which has four light input ports and four light output ports.

Each of the array type space optical switches 901 to 904 have constitutions which is similar to either one of the constitutions of the array type space optical switch using the interrupting plate as in the first embodiment, the array type space optical switch for moving the optical fiber end as in the fifth embodiment, and the array type space optical switch using the EDFA gate part as in the sixth embodiment. Even when either one is used, the photonic switching is simultaneously performed in four light transmission paths with one switching operation in these array type space optical switches 901 to 904.

The light transmission paths are connected to the light input ports of the array type space optical switch 901 from the inputting optical fibers 701 to 704 via the optical separator 601, and the light transmission paths are connected to the light input ports of the array type space optical switch 902 from the inputting optical fibers 705 to 708 via the optical separator 601. The light transmission paths are connected to the light input ports of the array type space optical switch 903 from the inputting optical fibers 701 to 704 via the optical separator 601, and the light transmission paths are connected to the light input ports of the array type space optical switch 904 from the inputting optical fibers 705 to 708 via the optical separator 601. The optical separator 601 is connected to the array type space optical switches 901 to 904 via the optical fibers.

The light output ports of the array type space optical switches 901, 902 are connected to an optical combiner 611 as an optical coupler via the optical fibers. The light output ports of the array type space optical switches 903, 904 are connected to an optical combiner 612 as the optical coupler via the optical fibers. The optical combiner 611 combines the lights transmitted via the array type space optical switches 901, 902 into one light, and the light combined by the optical combiner 611 is outputted to the outputting optical fiber 711. The optical combiner 612 combines the lights transmitted via the array type space optical switches 903, 904 into one light, and the light combined by the optical combiner 612 is outputted to the outputting optical fiber 712.

The optical combiner 611 is provided with optical gate switches 801 to 804, and the optical combiner 612 is provided with optical gate switches 805 to 808. The optical gate switch 801 performs the switching of the light obtained by coupling the light transmitted from the inputting optical fiber 701 via the optical separator 601 and the array type space optical switch 901 and the light transmitted from the inputting optical fiber 705 via the optical separator 601 and the array type space optical switch 902. The optical gate switch 802 performs the switching of the light obtained by coupling the light transmitted from the inputting optical fiber 702 via the optical separator 601 and the array type space optical switch 901 and the light transmitted from the inputting optical fiber 706 via the optical separator 601 and the array type space optical switch 902. The optical gate switch 803 performs the switching of the light obtained by coupling the light transmitted from the inputting optical fiber 703 via the optical separator 601 and the array type space optical switch 901 and the light transmitted from the inputting optical fiber 707 via the optical separator 601 and the array type space optical switch 902. The optical gate switch 804 performs the switching of the light obtained by coupling the light transmitted from the inputting optical fiber 704 via the optical separator 601 and the array type space optical switch 901 and the light transmitted from the inputting optical fiber 708 via the optical separator 601 and the array type space optical switch 902.

Moreover, the optical gate switch 805 performs the switching of the light obtained by coupling the light transmitted from the inputting optical fiber 701 via the optical separator 601 and the array type space optical switch 903 and the light transmitted from the inputting optical fiber 705 via the optical separator 601 and the array type space optical switch 904. The optical gate switch 803 performs the switching of the light obtained by coupling the light transmitted from the inputting optical fiber 702 via the optical separator 601 and the array type space optical switch 903 and the light transmitted from the inputting optical fiber 706 via the optical separator 601 and the array type space optical switch 904. The optical gate switch 807 performs the switching of the light obtained by coupling the light transmitted from the inputting optical fiber 703 via the optical separator 601 and the array type space optical switch 903 and the light transmitted from the inputting optical fiber 707 via the optical separator 601 and the array type space optical switch 904. The optical gate switch 808 performs the switching of the light obtained by coupling the light transmitted from the inputting optical fiber 704 via the optical separator 601 and the array type space optical switch 903 and the light transmitted from the inputting optical fiber 708 via the optical separator 601 and the array type space optical switch 904.

Similarly to the light transmission paths between each of the inputting optical fibers 701 to 708 and the outputting optical fibers 711, 712, the light transmission path between each of the inputting optical fibers 701 to 808 and each of the outputting optical fibers 713 to 718 is constituted of the optical separator 61, 4×4 array type space optical switch, optical combiner provided with the optical gate switch, and a plurality of optical fibers for connecting these components.

In the optical cross-connecting system of the eleventh embodiment, the signal light of 1550 nm band is inputted from each end surface of the inputting optical fibers 701 to 708 on the opposite side of the optical separator 601. For example, when the signal light inputted to the inputting optical fiber 701 is outputted from the outputting optical fiber 711, the array type space optical switch 901 is turned on, the array type space optical switch 902 is turned off, the optical gate switch 801 is turned on, and the optical gate switches 802 to 804 are turned off. Thereby, the inputting optical fiber 701 and the outputting optical fiber 711 are optically coupled via the optical separator 601, array type space optical switch 901 and optical combiner 611, and the light inputted to the inputting optical fiber 701 is outputted to the outputting optical fiber 711 without mixing with the lights from the inputting optical fibers 702 to 708.

Similarly to the operation of the above-described optical cross-connecting system, the complete driving of the 4×4 matrix type optical switch is realized by performing the switching operation of the array type space optical switch and optical gate switch to the other light input and output ports.

In the optical cross-connecting system of the eleventh embodiment, the array type space optical switches 901, 902, and optical gate switches 801 to 804 are used in the light transmission path between each of the inputting optical fibers 701 to 708 and the outputting optical fiber 711. Six optical switches in total are used in the light transmission path. Therefore, 6×8, that is, 48 optical switches in total are used in the entire 8×8 optical cross-connecting system. Different from this optical cross-connecting system, the 8×8 optical crossbar switch network as a conventional 8×8 optical cross-connecting system requires 64 optical switches in total, and the number of optical switches used in the optical cross-connecting system of the eleventh embodiment is ¾ of the number of optical switches in the conventional 8×8 optical crossbar switch network. The effect that the number of optical switches of the optical cross-connecting system is reduced becomes more remarkable when the scale of the optical cross-connecting system increases.

For example, when a 16×16 optical cross-connecting system using 16 wavelengths is constituted with the constitution similar to that of the light transmission path between the inputting optical fiber and the outputting optical fiber in the optical cross-connecting system of the eleventh embodiment, the necessary number of optical switches is 112 in total. On the other hand, when the 16×16 optical cross-connecting system is prepared with the constitution similar to that of the conventional optical crossbar switch network, 256 optical switches are necessary. Therefore, in the 16×16 system having the constitution similar to that of the optical cross-connecting system of the eleventh embodiment, the number of necessary optical switches is reduced to ½ of the number of optical switches in the conventional 16×16 optical crossbar switch network. When the semiconductor optical amplifier is used as the optical switch, the number of semiconductor optical amplifiers is reduced to ½.

Therefore, the number of optical switches necessary for the conventional matrix type optical switch is the square of the number of light input ports, but by constituting the matrix type optical switch with the combination of the array type space optical switch and gate switch, the number of necessary optical switches can remarkably be reduced. Moreover, since the size of the matrix type optical switch can be reduced by using the constitution of the optical cross-connecting system of the eleventh embodiment, the array type space optical switches can be arrayed.

In the optical cross-connecting system of the eleventh embodiment, each optical combiner is provided with the optical gate switch. The optical cross-connecting system which can perform the above-described switching operation may be constituted by disposing the optical gate switch on the optical separator 601, instead of the optical combiner.

The above-described optical switch of the present invention is not limited to the constitution of the array type space optical switch in the above-described first to sixth embodiments. Any other switch that has the characteristics of the array type space optical switch of each embodiment is included in the present invention, and the basic principle of the optical switch of the present invention can be utilized in various constitutions of array type space optical switches.

The shape of the interrupting plate used in the above-described embodiments is not limited to the shape shown in FIGS. 1, 3, 4, 5, 6 and 7. Any interrupting plate can be used as long as it shields the arbitrary light path for space propagation and it exerts no influence on the light not interrupted in the space propagation part during the shielding. Additionally, an optical shutter using a liquid crystal may be used instead of the interrupting plate.

Furthermore, when the end of the optical fiber is moved, the moving method is not particularly limited. For example, an electromagnetic system, an electric system, and any other method can be utilized.

Additionally, any part that has the same operation principle or function as that of the erbium-doped fiber amplifier (EDFA) gate part can be used for the EDFA gate. Moreover, the methods similar to the three methods of using the interrupting plate, moving the optical fiber end, and using the light amplifying or attenuating optical element, and the array type space optical switch prepared by combining these methods are also included in the present invention.

Furthermore, the space propagation part is not limited by the position of the interrupting plate, optical fiber movable part, or EDFA gate. For example, it is also possible to dispose a plurality of interrupting plates, optical fiber movable parts, or EDFA gates in one space propagation part.

Additionally, there are four light input ports and four light output ports in each array type space optical switch of the first to sixth embodiments, but the number of ports is not limited to four, and the number can freely be set to arbitrary numbers such as 8, 16, 32, 64. A multiplicity of optical fibers can be switched altogether by using the array type space optical switch.

Moreover, the input light wavelength is not limited to 1550 nm band in each array type space optical switch of the first to sixth embodiments. It can be set to 1300 nm band or the like, or it is also possible to propagate the lights not only of one wavelength but also of multiplexed wavelength. The light input direction is not limited to either one direction. The light input and output ports may be used in a mixed manner, or one port may be used for both input and output.

Furthermore, the optical switch system of the present invention is not limited to each optical cross-connecting system of the seventh to eleventh embodiments, the number of light input and output ports in the optical cross-connecting system can freely be to set to the arbitrary numbers such as 8, 16, 32, 64, and a multiplicity of optical fibers can be switched at the same time by using the optical cross-connecting system. Additionally, the number of light input ports may be different from the number of light output ports. For example, the number of light input ports is n and the number of light output ports is m, and the number of ports may be set to an arbitrary integer. The array type space optical switch disposed in the optical cross-connecting system can be replaced with any switch of the above-described first to sixth embodiments, and any other switch that has the same principle or function as that of the array type space optical switch.

Moreover, in order to compensate for the loss during the branching of the light, the array type space optical switch or the optical gate switch which has an optical amplifying function can also be used. Furthermore, in the optical cross-connecting system, the method of branching the optical fiber and the number of wavelengths to be controlled at the same time by the array type space optical switch can freely be set to the methods and the numbers other than those described in the above-described embodiments.

Additionally, the wavelength of the input light is not limited to the 1550 nm band in the optical cross-connecting systems of the seventh to eleventh embodiments. The 1300 nm or other bands can be used, or it is also possible to propagate the lights not only of one wavelength but also of multiplexed wavelength. The light input direction is not limited to either one direction. The light input and output ports may be used in a mixed manner, or one port may be used for both input and output.

Moreover, for the optical separator and the optical combiner used in each optical cross-connecting system of the seventh to eleventh embodiments, ordinary optical branching and coupling units can also be used, but by using a single/multi-combiner having a function of converting either one of the single mode and multi-mode of the optical fiber to the other one, the loss during the separating and combining of the light can be reduced. The single/multi-combiner is one type of optical coupler. This is prepared by bundling and fusing/connecting the vicinity of the tip ends of a plurality of single mode optical fibers form one fused/connected multi-mode optical fiber.

According to the optical switch of the present invention, the following effects are obtained. Specifically, when the photonic switching is performed between two optical fibers in each pair of optical fibers among a plurality of pairs of optical fibers, the plurality of pairs of optical fibers can be controlled to turn on or off at the same time.

According to the optical switch system of the present invention, the following effects are obtained. Specifically, while the function completely equivalent to that of the optical crossbar switch network as the conventional optical cross-connecting system is provided, the number of optical switches for use in the optical switch system can be reduced. Therefore, the amount of hardware of the optical switch is reduced, and the matrix type optical switch small in size and low in cost can be obtained.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical switch comprising:
    at least one optical fiber pair arranged so that a light emitted from a first optical fiber is coupled to a second optical fiber via a void; and
    an optical breaker for interrupting the optical coupling between said first and second optical fibers, said optical breaker comprising an EDFA gate on said first optical fiber.

2. The optical switch according to claim 1, further comprising a controller for supplying a control signal to said optical breaker to collectively interrupt all optical paths of said at least one optical fiber pair.

3. The optical switch according to claim 1, further comprising a controller for supplying a control signal to said optical breaker to collectively interrupt all optical paths of said at least one optical fiber pair other than a predetermined optical fiber pair.

4. The optical switch according to claim 1, further comprising a controller for supplying a control signal to said optical breaker to selectively interrupt optical paths of said at least one optical fiber pair.

5. An optical switch system comprising:
    at least one optical branching unit for branching at least one input light signal to a predetermined number of branched output lights;
    at least one optical combining unit for combining one of said branched output lights of said at least one optical branching unit; and
    at least one optical switch inserted between said optical branching unit and said at least one optical combining unit to which each of said branched output lights of the optical branching unit is supplied,
    said at least one optical switch comprising,
        at least one optical fiber pair arranged so that a light emitted from a first optical fiber is coupled to a second optical fiber via a void, and
        an optical breaker for interrupting the optical coupling between said first and second optical fibers.

6. The optical switch system according to claim 5, wherein said optical breaker comprises an interrupting part to be inserted to or removed from said void in response to a switching signal.

7. The optical switch system according to claim 6, wherein said interrupting part is collectively inserted to all said void of said at least one optical fiber pair excluding a predetermined optical fiber pair, and collectively removed from said void.

8. The optical switch system according to claim 7, wherein said interrupting part comprises an interrupting plate, and
    a notch is formed in said interrupting plate in a position corresponding to said void of said predetermined optical fiber pair.

9. The optical switch system according to claim 6, wherein said interrupting part comprises a plurality of interrupting plates provided with notches in mutually different positions.

10. An optical switch system comprising:
    at least one optical branching unit for branching at least one input light signal to a predetermined number of branched output lights;
    at least one optical combining unit for combining one of said branched output lights of said at least one optical branching unit; and
    at least one optical switch according to claim 9 inserted between said optical branching unit and said at least one optical combining unit to which each of said branched output lights of the optical branching unit is supplied.

11. The optical switch system according to claim 6, wherein said interrupting part is collectively inserted to all said void of said at least one optical fiber pair, and collectively removed from said void.

12. The optical switch system according to claim 6, wherein said interrupting part is disposed corresponding to said void, and comprises at least one interrupting plate for shielding only said corresponding void.

13. The optical switch system according to claim 5, wherein said optical breaker comprises at least one optical fiber deflector for moving the tip end of said first or second optical fiber.

14. An optical switch system comprising:
    at least one optical branching unit for branching at least one input light signal to a predetermined number of branched output lights;
    at least one optical combining unit for combining one of said branched output lights of said at least one optical branching unit; and
    at least one optical switch according to claim 13 inserted between said optical branching unit and said at least one optical combining unit to which each of said branched output lights of the optical branching unit is supplied.

15. The optical switch system according to claim 14, wherein said optical fiber deflector comprises:
    a magnetic material applied to the end of said first or second optical fiber, and
    an electromagnet for generating a magnetic field acting on said magnetic material.

16. The optical switch system according to claim 5, wherein said optical breaker comprises an EDFA gate disposed on said first optical fiber.

17. An optical switch system comprising:
   at least one optical branching unit for branching at least one input light signal to a predetermined number of branched output lights;
   at least one optical combining unit for combining one of said branched output lights of said at least one optical branching unit; and
   at least one optical switch according to claim 16 inserted between said optical branching unit and said at least one optical combining unit to which each of said branched output lights of the optical branching unit is supplied.

18. The optical switch system according to claim 5, wherein said optical breaker comprises a variable optical attenuator disposed on said first optical fiber.

19. The optical switch system of claim 5, wherein said optical breaker comprises an EDFA gate disposed on said first optical fiber.

20. The optical switch system according to claim 5, wherein said at least one optical combining unit comprises an optical gate switch inserted to an input branch.

21. The optical switch system according to claim 5, wherein said at least one optical branching unit comprises an optical gate switch inserted to a branch.

22. The optical switch system according to claim 5, wherein said at least one optical branching unit comprises a single/multi-combiner in which an input fiber comprises a single mode optical fiber and each of branches comprises a multi-mode optical fiber.

23. The optical switch system according to claim 5, wherein said at least one optical combining unit comprises a single/multi-combiner in which an input branch comprises a multi-mode optical fiber and an output fiber comprises a single mode optical fiber.

24. The optical switch system of claim 5, wherein said optical breaker comprises an interrupting part to be inserted to or removed from said void in response to a switching signal, and
   wherein said interrupting part comprises a plurality of interrupting plates provided with notches in mutually different positions.

25. The optical switch system of claim 5, wherein said optical breaker comprises at least one optical fiber deflector for moving the tip end of said first or second optical fiber.

26. An optical switch system comprising:
   a plurality of inputting optical fibers;
   a plurality of optical branching units connected to said inputting optical fibers for branching an input light to a predetermined number of branched output lights;
   a plurality of optical combining units to which each of said branched output lights outputted from each of said plurality of optical branching unit is supplied;
   outputting optical fibers connected to outputs of said plurality of optical combining units; and
   a plurality of optical gate switches inserted to transmission paths between outputs of said optical branching units and inputs of said optical combining units.

27. An optical switch comprising:
   at least one optical fiber pair arranged so that a light emitted from a first optical fiber is coupled to a second optical fiber via a void; and
   an optical breaker for interrupting the optical coupling between said first and second optical fibers,
      wherein said optical breaker comprises a liquid crystal optical shutter whose transmittance changes in response to a switching signal.

28. An optical switch system comprising:
   a plurality of inputting optical fibers;
   a plurality of optical branching units connected to said inputting optical fibers for branching an input light to a predetermined number of branched output lights;
   a plurality of optical combining units to which each of said branched output lights outputted from each of said plurality of optical branching unit is supplied;
   outputting optical fibers connected to outputs of said plurality of optical combining units; and
   a plurality of interrupting plates inserted between output ends of said optical branching units and input ends of said optical combining units in response to switching signals and provided with notches in predetermined positions.

29. An optical switch comprising:
   at least one optical fiber pair arranged so that a light emitted from a first optical fiber is coupled to a second optical fiber via a void; and
   an optical breaker for interrupting the optical coupling between said first and second optical fibers,
      wherein said optical breaker comprises a semiconductor optical amplifier disposed on said first optical fiber.

* * * * *